US012625661B2

(12) United States Patent
Maruyama et al.

(10) Patent No.: US 12,625,661 B2
(45) Date of Patent: May 12, 2026

(54) DISPLAY CONTROL SYSTEM, METHOD, AND COMPUTER-READABLE STORAGE MEDIUM

(71) Applicant: HONDA MOTOR CO., LTD., Tokyo (JP)

(72) Inventors: Masaki Maruyama, Wako (JP); Haruko Okuyama, Wako (JP); Tatsuya Iwasa, Wako (JP); Tsuyoshi Nojiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/903,366

(22) Filed: Oct. 1, 2024

(65) Prior Publication Data

US 2025/0117175 A1     Apr. 10, 2025

(30) Foreign Application Priority Data

Oct. 6, 2023    (JP) ................................. 2023-174617

(51) Int. Cl.
*G06F 3/14*        (2006.01)
*G06F 3/16*        (2006.01)
(52) U.S. Cl.
CPC . *G06F 3/14* (2013.01); *G06F 3/16* (2013.01)

(58) Field of Classification Search
CPC ........... B60W 50/14; B60W 2050/143; B60W 2050/146; G08G 1/16; G08G 1/166; G08G 1/167; G08G 1/168; G06F 3/16; G06F 3/14
See application file for complete search history.

(56) References Cited

U.S. PATENT DOCUMENTS

| | | | |
|---|---|---|---|
| 10,723,264 B2 | 7/2020 | Fujisawa et al. | |
| 10,882,538 B1* | 1/2021 | Witt ...................... | G01S 7/6272 |
| 2015/0061895 A1* | 3/2015 | Ricci ...................... | G06V 40/28 |
| | | | 340/902 |
| 2018/0086346 A1 | 3/2018 | Fujisawa et al. | |
| 2018/0118109 A1 | 5/2018 | Fujisawa et al. | |
| 2024/0166229 A1 | 5/2024 | Maruyama et al. | |

FOREIGN PATENT DOCUMENTS

| | | |
|---|---|---|
| JP | 2016-197407 A | 11/2016 |
| WO | 2022/190630 A1 | 9/2022 |

* cited by examiner

*Primary Examiner* — Priyank J Shah
(74) *Attorney, Agent, or Firm* — THOMAS | HORSTEMEYER, LLP

(57)         ABSTRACT

A display control system for a moving body, the display control system comprising an audio source device configured to give audio guidance about the moving body; a display device capable of displaying information indicating an external environment in surroundings of the moving body, and a control device, wherein the control device processes audio information of the audio guidance to be output by the audio source device, and acquires a signal waveform of the audio information, and controls the display device for a display mode to be output by the display device in synchronization with the acquired signal waveform.

19 Claims, 16 Drawing Sheets

FIG. 2

F I G. 4A
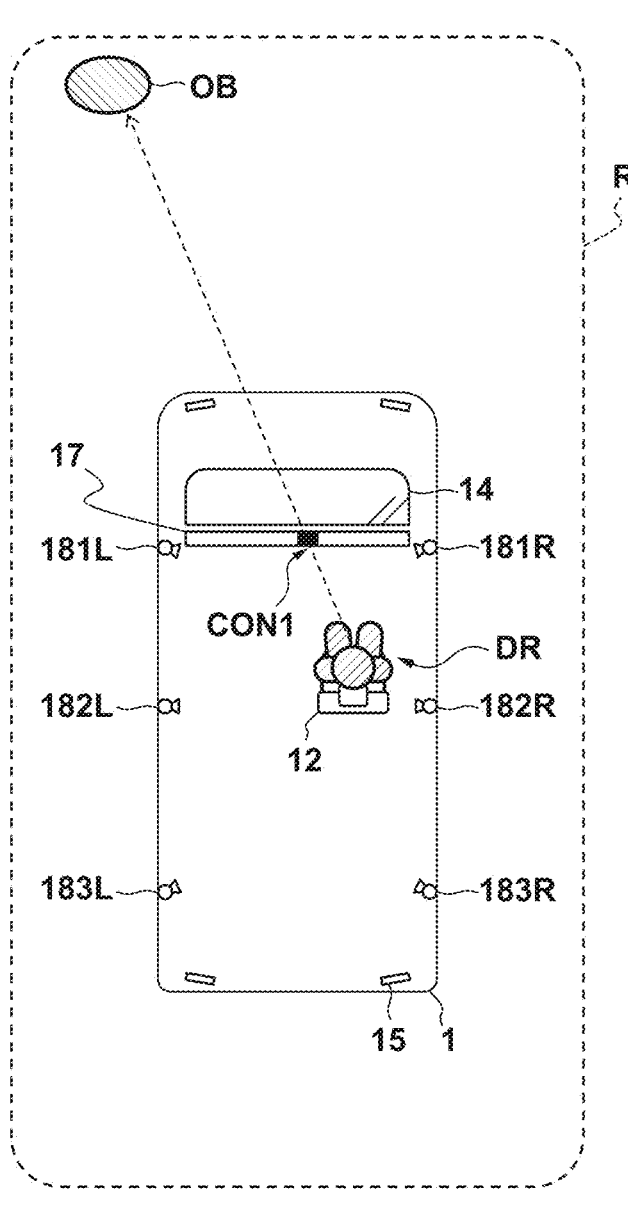

FIG. 5

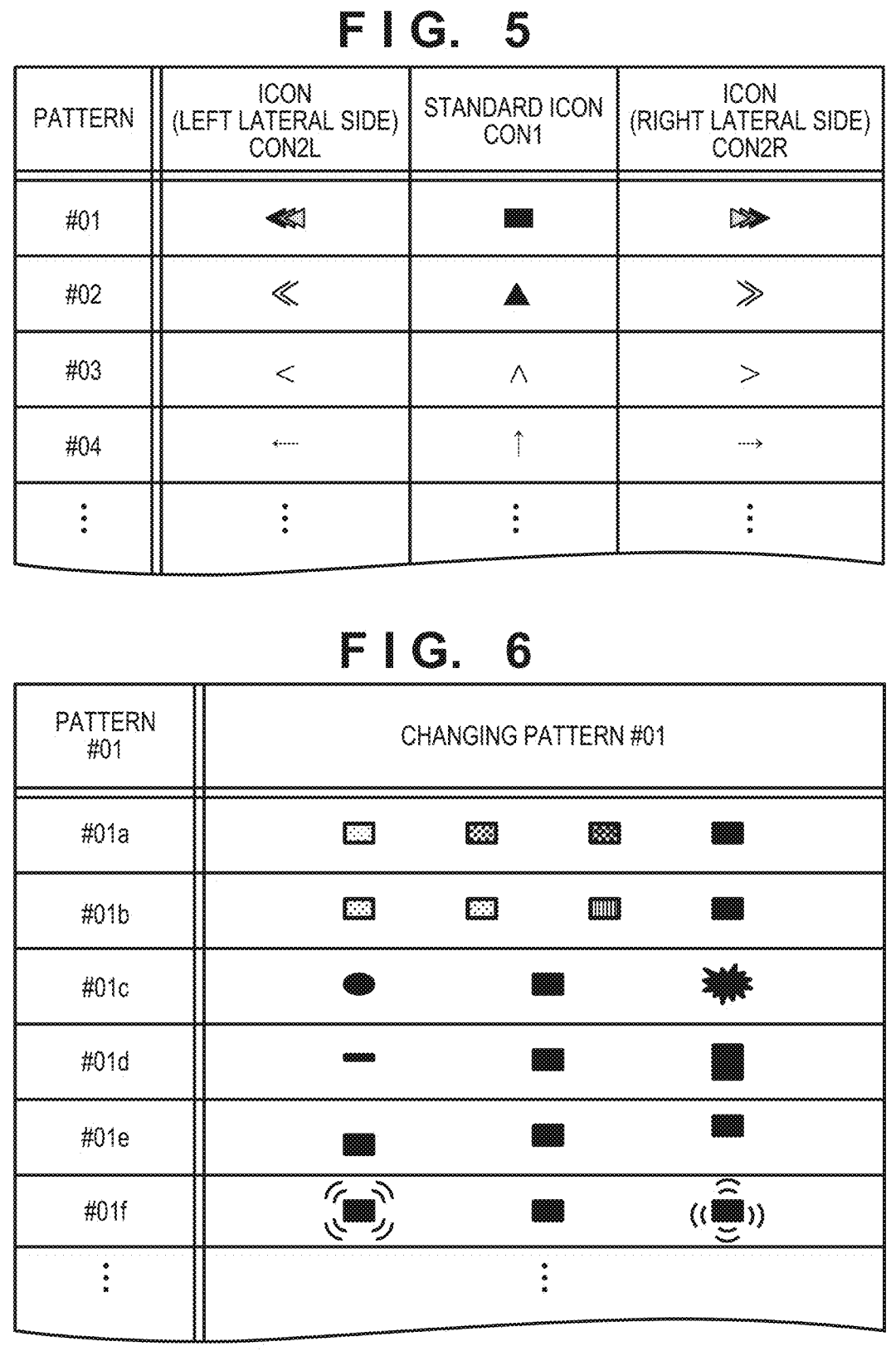

| PATTERN | ICON (LEFT LATERAL SIDE) CON2L | STANDARD ICON CON1 | ICON (RIGHT LATERAL SIDE) CON2R |
|---|---|---|---|
| #01 | ◀◀ | ■ | ▶▶ |
| #02 | ≪ | ▲ | ≫ |
| #03 | < | ∧ | > |
| #04 | ⟵ | ↑ | ⟶ |
| ⋮ | ⋮ | ⋮ | ⋮ |

FIG. 6

| PATTERN #01 | CHANGING PATTERN #01 | | | |
|---|---|---|---|---|
| #01a | ▢ | ▨ | ▨ | ■ |
| #01b | ▢ | ▨ | ▥ | ■ |
| #01c | ● | | ■ | ✳ |
| #01d | ▬ | | ▪ | ▮ |
| #01e | ◼ | | ◼ | ◼ |
| #01f | 🔊■ | | ■ | (((■))) |
| ⋮ | ⋮ | | | |

F I G. 7
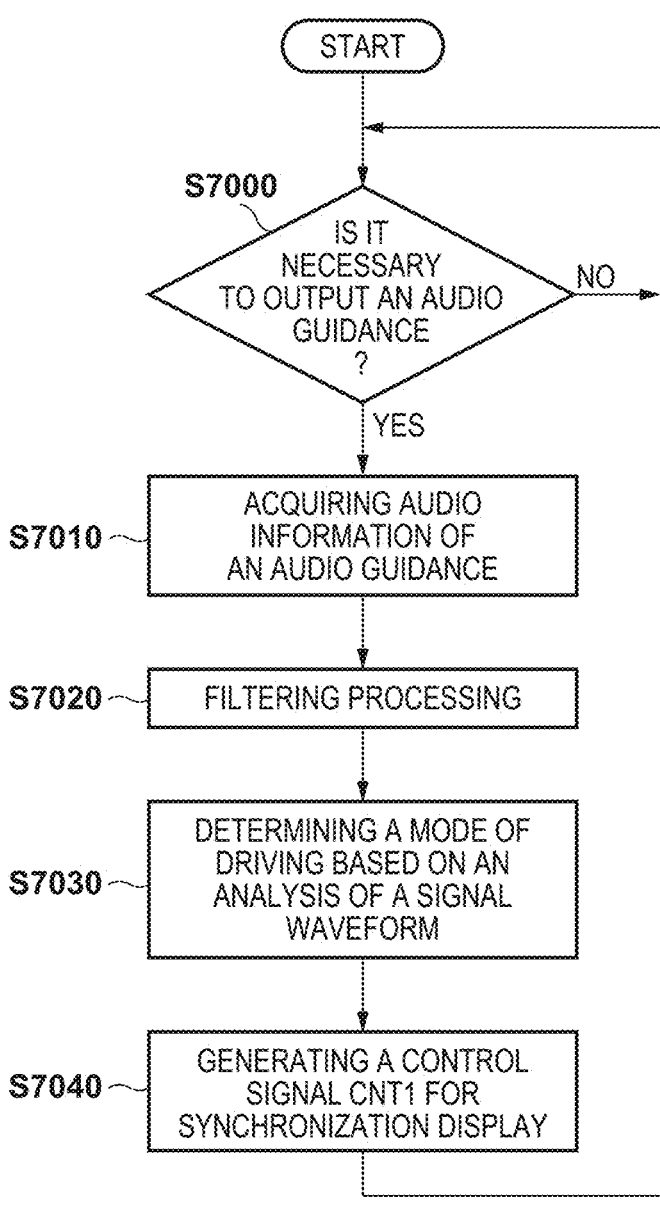

UNDER AUDIO GUIDANCE

UNDER SYNCHRONIZATION DISPLAYING

REFERENCE

TIME

TIME

WD2

SIG$_{DRV}$

F I G. 9C

UNDER AUDIO GUIDANCE

WD2

TIME

Ta

SIG$_{DRV}$

UNDER SYNCHRONIZATION DISPLAYING

Tb

TIME

F I G. 9D

F I G. 9E

F I G.  10
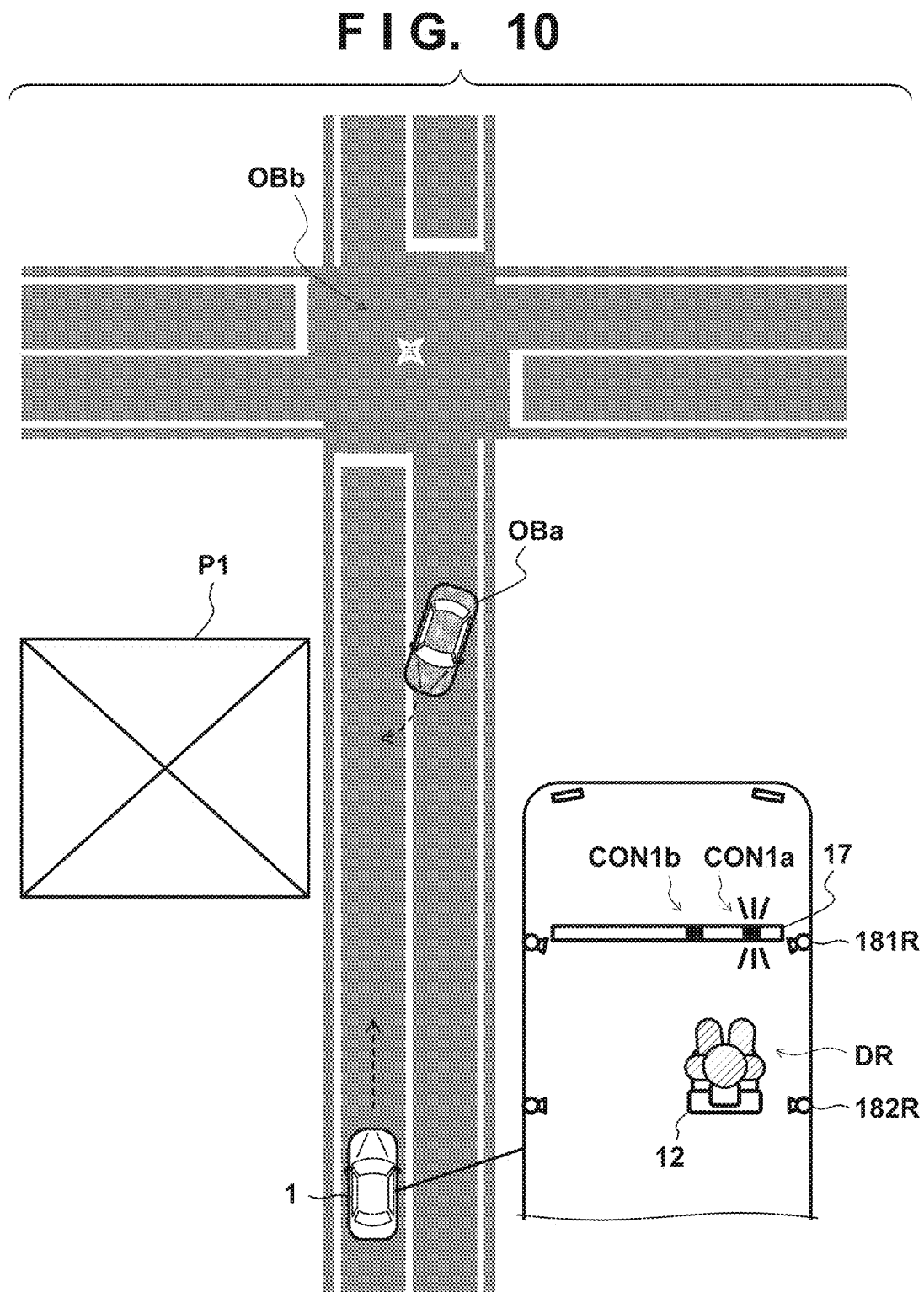

DISPLAY CONTROL SYSTEM, METHOD, AND COMPUTER-READABLE STORAGE MEDIUM

CROSS-REFERENCE TO RELATED APPLICATION(S)

This application claims priority to and the benefit of Japanese Patent Application No. 2023-174617, filed on Oct. 6, 2023, the entire disclosure of which is incorporated herein by reference.

BACKGROUND OF THE INVENTION

Field of the Invention

The present invention mainly relates to a display control system.

Description of the Related Art

In these years, efforts to provide a sustainable transportation system in consideration of further safety of traffic are actively being made, and research and development on preventive safety technology are being conducted to achieve such a transportation system.

For example, some vehicles include a display device capable of displaying position information of surrounding objects (pedestrians, other vehicles, and the like) (International Publication No. 2022/190630 and Japanese Patent Laid-Open No. 2016-197407). According to such a configuration, the driver is able to easily recognize the presence of the objects in the surroundings of the vehicle, and an appropriate driving mode of the vehicle is enabled.

In general, there may be a demand for a technique capable of further improving the traffic safety by setting a more appropriate driving mode. The same demand also applies to moving bodies without wheels.

SUMMARY OF THE INVENTION

It is an exemplary object of the present invention to improve traffic safety, and thus an object is to contribute to development of a sustainable transportation system.

One of the aspects of the present invention provides a display control system for a moving body, the display control system comprising: an audio source device configured to give audio guidance about the moving body; a display device capable of displaying information indicating an external environment in surroundings of the moving body; and a control device, wherein the control device processes audio information of the audio guidance to be output by the audio source device, and acquires a signal waveform of the audio information, and controls the display device for a display mode to be output by the display device in synchronization with the acquired signal waveform.

Further features of the present invention will become apparent from the following description of exemplary embodiments with reference to the attached drawings.

BRIEF DESCRIPTION OF THE DRAWINGS

FIG. 2 is a schematic diagram illustrating relative positions of individual elements of the vehicle;

FIG. 4A is a schematic diagram illustrating an example of a mode of driving a display device and an audio source device;

FIG. 5 is a view illustrating an example of icons used in the display device;

FIG. 6 is a view illustrating an example of synchronization display of the icons used in the display device;

FIG. 7 is a flowchart illustrating an example of control contents by the control device for achieving the synchronization display;

FIG. 8 illustrates an example of signal waveforms that can be generated by filtering processing;

FIG. 9B is a diagram illustrating an example of a mode of driving for the synchronization display;

FIG. 9C is a diagram illustrating an example of a mode of driving for the synchronization display;

FIG. 9D is a diagram illustrating an example of a mode of driving for the synchronization display;

FIG. 9E is a diagram illustrating an example of a mode of driving for the synchronization display;

FIG. 10 is a schematic diagram illustrating an example of a mode of driving the display device and the audio source device.

DESCRIPTION OF THE EMBODIMENTS

Figure 1:
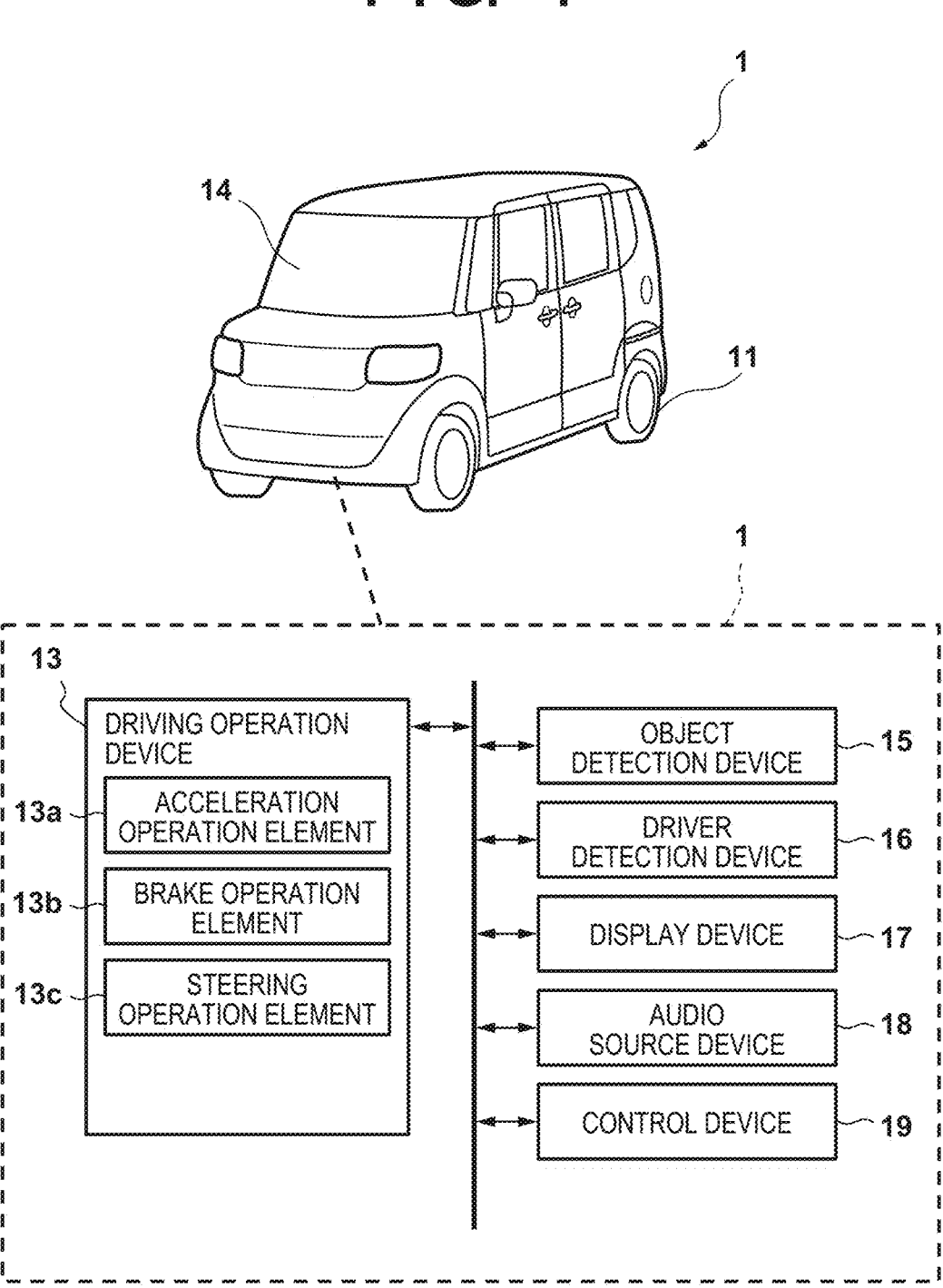
FIG. 1 is a diagram illustrating a configuration of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 2:
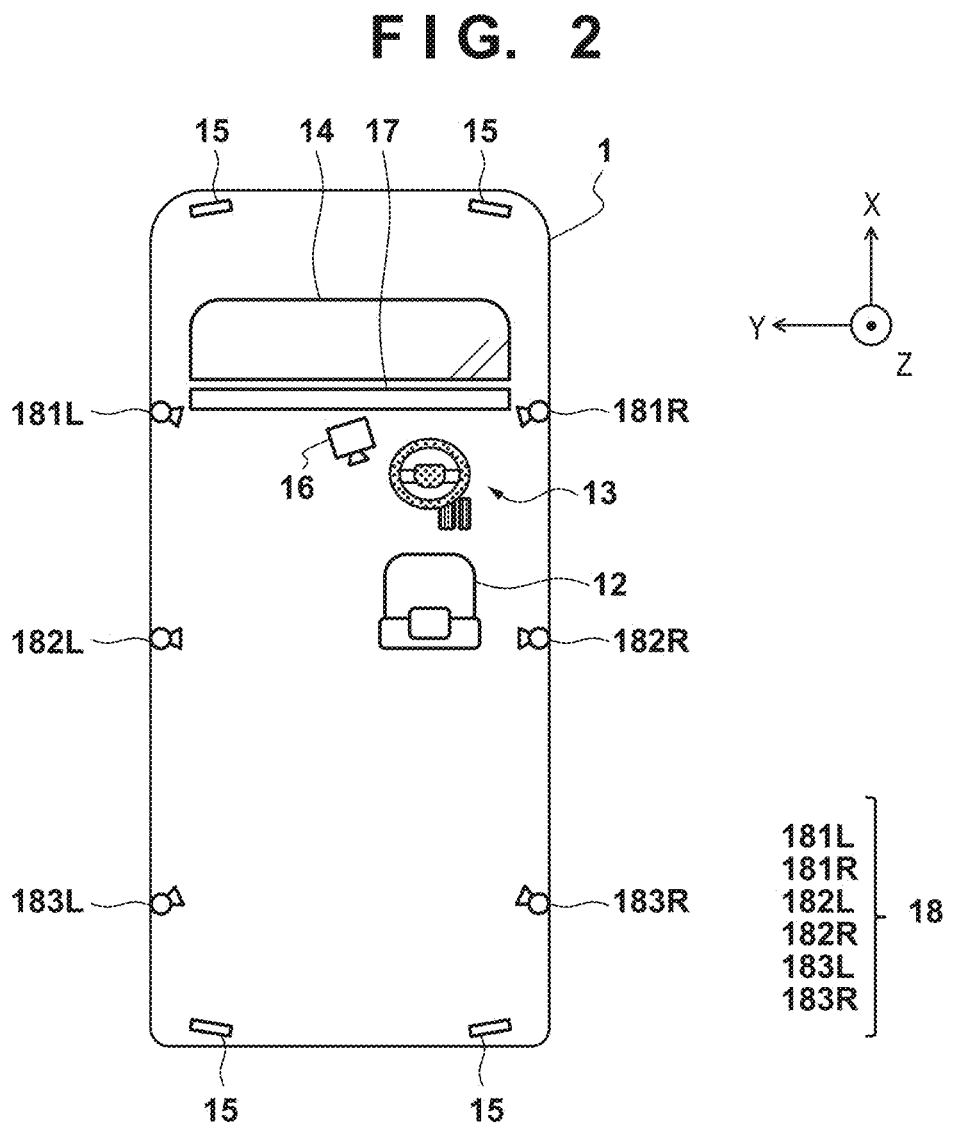

FIG. 1 illustrates a configuration of a vehicle 1 according to an embodiment. FIG. 2 is a schematic diagram for describing relative positions of individual elements included in the vehicle 1. The vehicle 1 includes wheels 11, a driver's seat 12, a driving operation device 13, a window member 14, a first detection device 15, a second detection device 16, a display device 17, an audio source device 18, and a control device 19.

In the present embodiment, the vehicle 1 is a four-wheeled vehicle including a pair of left and right front wheels and a pair of left and right rear wheels as the wheels 11, but the number of the wheels 11 is not limited to this example. In addition, the vehicle 1 is a boarding type of vehicle in which the driver is able to sit on the driver's seat 12, but may be a straddle type vehicle in which a seat for the driver to sit astride is provided instead of the driver's seat 12.

In the drawing, X axis, Y axis, and Z axis, which are orthogonal to one another, are illustrated in order to facilitate understanding of the structure (the same reasoning also applies to other drawings to be described later). X direction corresponds to a front-and-rear direction, Y direction corresponds to a left-and-right direction, and Z direction corresponds to an up-and-down direction. In the present specification, terms such as front/rear, left/right (lateral side), and up/down respectively denote relative positional relationships with respect to a vehicle body. For example, expressions such as "front" and "front side" correspond to +X direction, and terms such as "rear" and "rear side" correspond to −X direction. Similarly, expressions such as an inner side (inside) of the vehicle body and an outer side (outside) of the vehicle body respectively denote relative positional relationships with respect to the vehicle body.

The driving operation device 13 includes an acceleration operation element 13a, a brake operation element 13b, and a steering operation element 13c, and is disposed in the vicinity of the driver's seat 12 to be accessible by the driver. The acceleration operation element 13a is configured to be capable of receiving, from the driver, an operation input for accelerating or keeping the travel of the vehicle 1, and an accelerator pedal can be used as its typical example. The brake operation element 13b is configured to be capable of receiving, from the driver, an operation input for decelerating or stopping the vehicle 1, and a brake pedal can be used as its typical example. The steering operation element 13c is configured to be capable of receiving, from the driver, an operation input for making a turn or changing the traveling direction the vehicle 1, and a steering wheel can be used as its typical example. Note that any other known configuration such as a button type switch or a rotary lever may be adopted for the operation elements 13a to 13c.

The window member 14 is a light-transmissive plate member that defines the inside and the outside of the vehicle, and is disposed in a front portion of the vehicle 1, that is, in the present embodiment, on a forward side of the driver's seat 12 and the driving operation device 13. Thus, the driver is able to visually recognize the outside of the vehicle from the inside of the vehicle through the window member 14. The window member 14 can be expressed as a windshield or the like, but may be expressed as a front window or the like.

The first detection device 15 detects an external environment in the surroundings of the vehicle 1 (in order to distinguish from the detection device 16 to be described later, the first detection device will be referred to as an external environment detection device 15). The external environment mentioned here denotes an external environment that the driver has to recognize in the driving operation of the vehicle 1, and can be interpreted in a broad sense to include an external environment directly or indirectly related to a driver's driving operation. Examples include a surrounding environment of the self-vehicle indicating the presence of an object in the surroundings of the vehicle 1, and a road environment indicating the presence of an intersection or an on-road installation (a traffic light, a road sign, or the like). In addition, examples of the object include any other obstacles such as a pedestrian and another vehicle, on which contact with the self-vehicle should be avoided.

In the following description, an object is exemplified as a typical element of the external environment to be a detection target, but it may be an intersection or an on-road installation. In the present specification, "object or the like" can be expressed, in a case where no particular distinction is needed.

As the external environment detection device 15, a camera including a CCD/CMOS image sensor or the like is typically used. A plurality of cameras may be used to be capable of detecting a situation in the surroundings of the vehicle 1, but an omnidirectional camera may be used. The external environment detection device 15 monitors a situation in the surroundings of the vehicle 1, and thus may be referred to as a surroundings monitoring device or the like, or may be simply referred to as a monitoring device or the like.

The second detection device 16 detects the driver who is seated on the driver's seat 12 and a posture of the driver (in order to distinguish from the detection device 15, which has been described above, the second detection device 16 will be referred to as a driver detection device 16). A camera can be typically used as the driver detection device 16. The driver detection device 16 monitors a state of the driver, and thus may be referred to as a driver monitoring device or the like, or may be simply referred to as a monitoring device or the like.

The display device 17 extends in the left-and-right direction to correspond to the width of the window member 14. In the present embodiment, below the window member 14, the display device 17 can extend in a band shape along a lower edge portion of the window member 14. Such a band-shaped display device 17 can be typically disposed in a dashboard including an instrument panel in close proximity to the window member 14 side to be visually recognizable from the driver.

In the display device 17, light source elements such as organic EL or LED are arrayed along a display range that extends in the left-and-right direction together with its housing. Thus, it becomes possible to display position information of an object or the like present in the surroundings of the vehicle 1. Although details will be described later, a display mode on the display device 17 is changeable, based on a detection result of the external environment detection device 15.

In the present embodiment, a plurality of audio source devices 18 are provided to surround the vehicle 1, but a plurality of audio source devices may be provided around the driver's seat 12. In the example of FIG. 2, it is assumed that six audio source devices 18 are disposed in total, including pairs of left and right audio source devices 181L and 181R, 182L and 182R, and 183L and 183R. For example, on a left lateral side, the audio source devices 181L, 182L, and 183L can be disposed in the order from the front side to the rear side, and on a right lateral side, the audio source devices 181R, 182R, and 183R can be disposed in the order from the front side to the rear side.

Although details will be described later, the audio source device 18 generates one or more kinds of sounds, and is configured to be capable of notifying of the position information of an object or the like present in the surroundings of the vehicle 1, and its generation mode is changeable, based on a detection result of the external environment detection device 15.

Note that the display device 17 and the audio source device 18 each have a function of notifying the driver of the position information of an object or the like. Therefore, they may be collectively referred to as a notification device, or may be individually referred to a first notification device and a second notification device.

The control device 19 is configured to be capable of controlling individual elements included in the vehicle 1, and in the present embodiment, mainly controls the display device 17 and the audio source device 18, based on detection results of the external environment detection device 15 and the driver detection device 16.

The control function by the control device 19 is achieved by a central processing unit (CPU) executing a predetermined program while developing the program in a memory, but may be achieved on a semiconductor device such as an application specific integrated circuit (ASIC). That is, the control function by the control device 19 is achievable on any of hardware and software.

Figure 3:
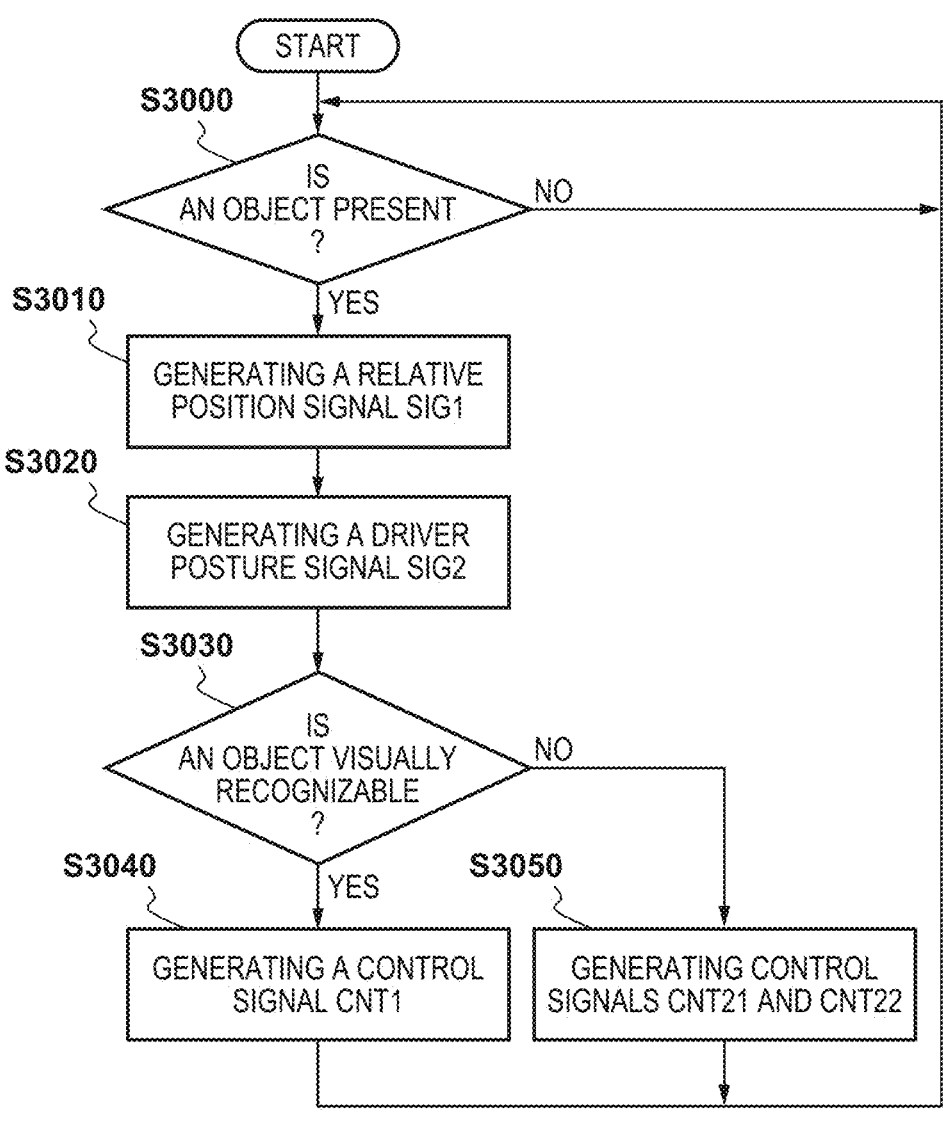
FIG. 3 is a flowchart illustrating an example of control contents by a control device.

FIG. 3 is a flowchart illustrating an example of control contents by the control device 19 (here, in order to simplify the description, a case where an object is detected by the external environment detection device 15 will be described. However, such a description also applies to a case where any other material other than the object is detected). Its outline is that in the case where an object is detected by the external environment detection device 15, the display device 17 and the audio source device 18 notify of the position information of the object in a mode corresponding to a detected position of the object. The present flowchart may be started when the vehicle 1 is started up, but may be performed, based on switching between ON and OFF of a notification function, or may be performed in response to satisfying another predetermined condition.

In step S3000 (hereinafter, simply referred to as "S3000". The same description also applies to the other steps to be described later), whether an object is present in the surroundings of the vehicle 1 is determined, based on a detection result of the external environment detection device 15. In the present embodiment, it is assumed that when an object located within a reference range from the vehicle 1 is detected, it is determined that the object is present in the surroundings of the vehicle 1. Such a reference range denotes a range necessitating attention of the driver, and will also be referred to as a detection target range of an object by the external environment detection device 15 (hereinafter, referred to as a "detection target range").

For example, a camera can be generally used as the external environment detection device 15, but in a case where not only an object is included in image data obtained by the camera but also the distance to the object is equal to or smaller than a reference, it is determined that the object is present in the surroundings of the vehicle 1. Therefore, the external environment detection device 15 has a distance measuring function, and typically a compound-eye camera can be used, but alternatively or additionally, another distance measuring device such as a millimeter wave radar or a light detector and ranging (LiDAR) may be used.

Although details will be described later, the detection target range of an object by the external environment detection device 15 may be different depending on X direction or Y direction with respect to the vehicle 1.

In a case where it is determined that the object is present in the surroundings of the vehicle 1 (the object is located within the detection target range), the processing proceeds to S3010, and in the other cases, the processing returns to S3000.

In S3010, a relative position of the object that has been detected by the external environment detection device 15 with respect to the vehicle 1, that is, the distance from the vehicle 1 to the object in X direction and/or Y direction in the present embodiment is identified, and information indicating the distance is generated as a relative position signal SIG1.

In S3020, a posture of the driver is identified, based on a detection result of the driver detection device 16. In the present embodiment, the position of the head (mainly eyes) of the driver in the vehicle 1 is identified, and information indicating the position is generated as a driver posture signal SIG2.

In S3030, it is determined whether the object is present at a position visually recognizable from the driver through the window member 14, based on the relative position of the object and the posture of the driver. The present determination may be made by arithmetic processing, based on the relative position signal SIG1 and the driver posture signal SIG2. In a case where the object is visually recognizable, the processing proceeds to S3040, and in the other cases, the processing proceeds to S3050.

In S3040 (in the case where it is determined that the object is visually recognizable), a control signal CNT1 is output to control the driving of the display device 17.

As will be described later in detail, the control signal CNT1 is generated, based on the relative position signal SIG1 and the driver posture signal SIG2.

In S3050 (in the case where it is determined that the object is visually unrecognizable), a control signal CNT21 is output to control the driving of the display device 17, and in addition, a control signal CNT22 is output to control the driving of the audio source device 18.

As will be described later in detail, the control signals CNT21 and CNT22 are generated, based on the relative position signal SIG1 and the driver posture signal SIG2.

Here, in the following description, whether the object is visually recognizable from the driver through the window member 14 will be simply expressed as "visually recognizable" or "visually unrecognizable", in some cases.

Figure 4B:
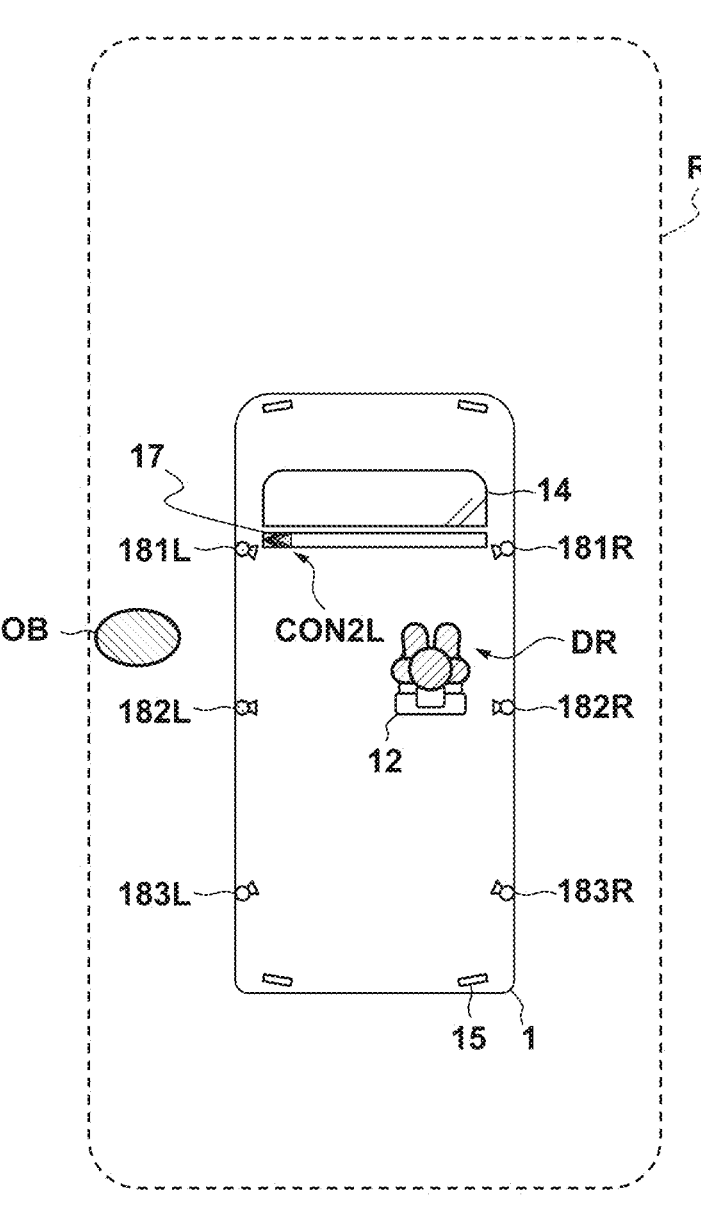
FIG. 4B is a schematic diagram illustrating an example of a mode of driving the display device and the audio source device.
Figure 4C:
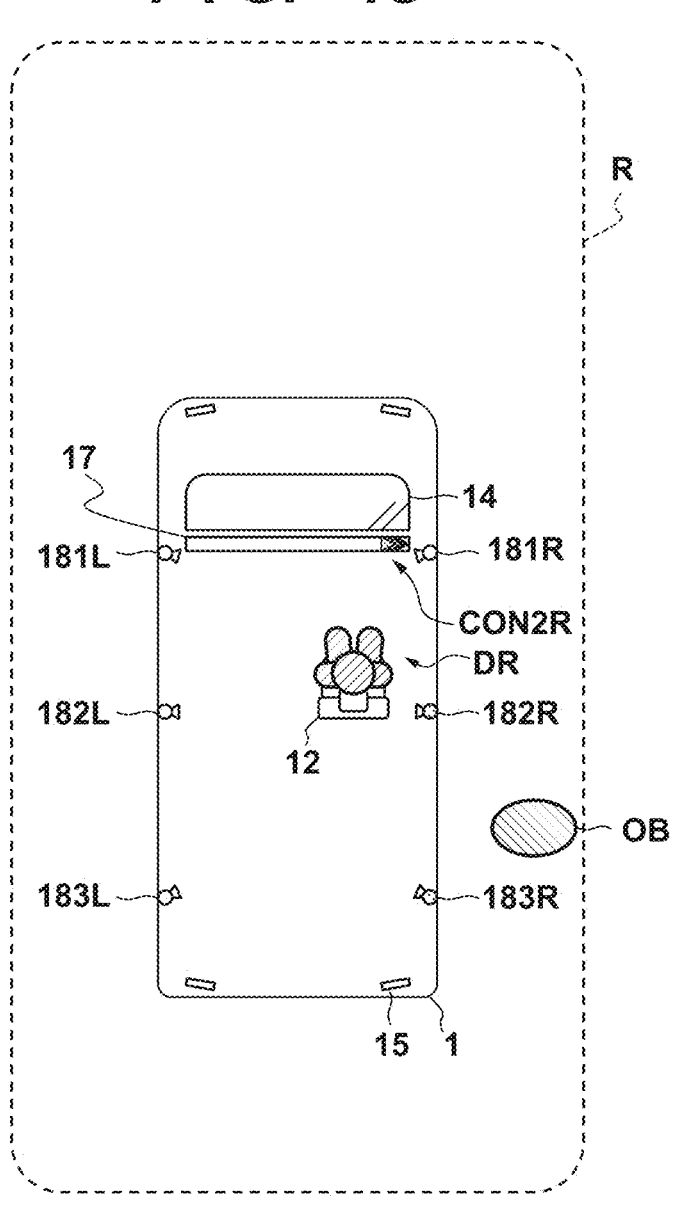
FIG. 4C is a schematic diagram illustrating an example of a mode of driving the display device and the audio source device.

FIGS. 4A to 4C illustrate some examples of modes of driving the display device 17 and the audio source device 18, in a case where the object OB is detected by the external environment detection device 15 (the case of Yes determination in S3000).

FIG. 4A illustrates a case where an object OB, which is visually recognizable from a driver DR, is detected by the external environment detection device 15 (the case of Yes determination in S3030).

FIG. 4B illustrates a case where an object OB, which is visually unrecognizable by the driver DR, is detected by the external environment detection device 15 (the case of No determination in S3030), and the object OB is located on a left lateral side of the vehicle 1.

FIG. 4C illustrates a case where an object OB, which is visually unrecognizable by the driver DR, is detected by the external environment detection device 15 (the case of No determination in S3030), and the object OB is located on a right rear side of the vehicle 1.

Note that a broken line in the drawing indicates a detection target range R by the external environment detection device 15. As an example, the detection target range R is set to be wider on a forward side of the vehicle 1 than on a rear side of the vehicle 1 and to be relatively narrow on both lateral sides of the vehicle 1. In addition, some elements are not illustrated so that the drawings can be easily viewed.

In the example of FIG. 4A, the object OB, which has been detected by the external environment detection device 15, is visually recognizable from the driver DR through the window member 14. Therefore, the display device 17 displays the position information of the object OB with use of an icon CON1, based on the control signal CNT1.

Here, the icon CON1 is displayed at a position corresponding to the object OB, and in the band-shaped display device 17 according to the present embodiment, the display position of the icon CON1 and the object OB desirably coincide with each other in the up-and-down direction in the visual line of the driver DR. In the case of the present example, the icon CON1 is displayed at a position on a broken line arrow indicating a visual line direction in a top view.

The display position of the icon CON1 is calculable, based on the relative position signal SIG1 and the driver posture signal SIG2. The control signal CNT1 may be generated, based on the relative position signal SIG1 and the driver posture signal SIG2.

In the example of FIG. 4B, the object OB, which has been detected by the external environment detection device 15, is located on a left lateral side of the window member 14 (on the outside of the window member 14) in the visual line of the driver DR, and thus the object OB is visually unrecognizable from the driver DR through the window member 14. Therefore, the display device 17 displays the position information of the object OB with use of an icon CON2L, based on the control signal CNT21.

It is assumed that the object OB is located on the outside of the window member 14, and such an icon CON2L is displayed on one end portion (here, a left end portion) corresponding to the object OB out of both end portions of the band-shaped display device 17. The control signal CNT21 may be generated, based on the relative position signal SIG1 and the driver posture signal SIG2.

Additionally, the plurality of audio source devices 18 are selectively driven, based on the control signal CNT22. To be specific, some (at least one) audio source devices 18 corresponding to the relative position of the object OB are driven. Here, it is sufficient if the at least one audio source device 18, which is to be driven, enables the driver DR to visually recognize the relative position of the object OB from the sounds generated by the at least one audio source device (in particular, the direction in which the object OB is present, that is, a relative direction). That is, such at least one audio source device that enables this is selected from the plurality of audio source devices 18, and is then driven. In the present embodiment, it is assumed that the audio source devices 181L and 182L are driven.

Force of driving (the volume, the sound range, and the like of) the audio source device 18, which is to be driven, is individually adjusted, based on the relative position of the object OB. The control signal CNT22 may be generated, based on the relative position signal SIG1 and the driver posture signal SIG2.

For example, out of the audio source devices 181L and 182L to be driven in the present embodiment, by increasing the force of driving one and decreasing the force of driving the other one, equalizing the forces of driving the both, or the like, it becomes possible to represent in detail in which position on the left lateral side of the vehicle 1 the object OB is present. In addition, it becomes also possible to represent that the object OB is in close proximity to the vehicle 1 by increasing the force of driving the audio source device 18, and it becomes also possible to represent that the object OB is apart from the vehicle 1 by decreasing the force of driving the audio source device 18.

Note that the description has been given assuming that the plurality of audio source devices 18 are used in the present embodiment. However, it is sufficient to adopt a configuration having directivity so that the relative position of the object OB is visually recognizable. Therefore, a single audio source device 18 may be used.

In the example of FIG. 4C, the object OB, which has been detected by the external environment detection device 15, is located on a right lateral side of the window member 14 (on the outside of the window member 14) in the visual line of the driver DR, and thus the object OB is visually unrecognizable from the driver DR through the window member 14. Therefore, the display device 17 displays the position information of the object OB with use of an icon CON2R, based on the control signal CNT21.

The icon CON2R is displayed on one end portion (here, a right end portion) corresponding to the object OB out of both end portions of the band-shaped display device 17.

Additionally, out of the plurality of audio source devices 18, a part (at least one) corresponding to the relative position of the object OB is driven, based on the control signal CNT22. In the present embodiment, it is assumed that the audio source devices 182R and 183R are driven.

The icons CON1, CON2L, and CON2R may desirably have visually different shapes from one another. These shapes are not limited to the modes illustrated in FIGS. 4A to 4C, and may be any shapes that are visually and intuitively recognizable from the user including the driver DR. For example, any other icon may be selected and used from several patterns illustrated in FIG. 5. Alternatively, several patterns exemplified here may be used in combination, or alternatively or additionally, any other known icon may be used.

The icons CON2L and CON2R can be displayed in shapes that are left-right symmetrical to each other, but a parameter indicating the degree of emphasis, such as its size and color shading, may be changed depending on the relative position of the object OB. For example, in the case of FIG. 4B, the icon CON2L may be displayed to have a longer and narrower shape, as the position of the object OB on the left lateral side of the vehicle 1 moves rearward.

It is assumed that the control device 19 continuously controls the driving of the display device 17 and the audio source device 18. Therefore, when the object OB moves and the relative position of the object OB changes, the modes of driving the display device 17 and the audio source device 18 can be adjusted or changed to follow a change. Similarly, when the posture (the position of the head) of the driver DR changes in the driver's seat 12, the modes of driving the display device 17 and the audio source device 18 can be adjusted or changed to follow a change.

The control device 19 may control the driving of them, based on switching between ON and OFF of the notification function. Alternatively, in a case where the vehicle 1 has a driving support function (a function performed by an in-vehicle electronic control unit (ECU) for partially or entirely performing an acceleration operation, a brake operation, and a steering operation, instead of the driver DR), controlling the driving of them may be conducted in a manual driving mode, and may be suppressed in a driving support mode.

According to the above configuration, in the case where the object OB is visually recognizable through the window member 14, the position information of the object OB is displayed in a first mode (here, with use of the icon CON1) at the position corresponding to the object OB in the display device 17. On the other hand, in the case where the object OB is visually unrecognizable, the position information of the object OB is displayed in a second mode (here, with use of the icon CON2L or CON2R) at one end portion (a left end portion or a right end portion) corresponding to the position of the object OB out of both end portions of the display device 17.

According to such a configuration, the driver DR is able to visually recognize the presence of the object OB in the surroundings of the vehicle 1 appropriately, and the mode of driving the vehicle 1 can be made a more appropriate one.

In the case where the object OB is visually unrecognizable, the audio source device 18 further notifies the driver DR of the presence of the object OB to indicate the relative position of the object OB. This enables the driver DR to visually recognize the presence of the object OB in the surroundings of the vehicle 1 more appropriately.

In order to achieve the above-described effects appropriately, a system in which some of the elements included in the vehicle 1 are selected or combined together may be adopted. For example, a display control system including the display device 17 and the control device 19 may be adopted as an in-vehicle system. Such an in-vehicle system may further include the audio source device 18, and alternatively or additionally may further include the driving operation device 13, the window member 14, the external environment detection device 15, and/or the driver detection device 16.

The audio source device 18, by the way, is capable of giving audio guidance about the vehicle 1, and in the present embodiment, gives audio guidance for traveling guidance of the vehicle 1. It is sufficient if the audio guidance notifies the driver of an external environment that necessitates recognition when the driver actually performs a driving operation or an external environment to which attention of the driver is recommended. Examples of audio information by the audio guidance include "Turn to the right at that intersection."

"Turn to the left at the next traffic light."

"There is an oncoming vehicle. Please be careful."

and the like, and can be configured with speech in a predetermined language. The audio information may be formed with audio data generated by speech synthesis, or may be formed with audio data generated by analog-to-digital conversion after recording. Such audio information can be processed by the audio source device 18, is subject to digital-to-analog conversion to be recognizable to the driver by hearing sense, and is output as speech.

In the above example, the intersection, the traffic light, and the oncoming vehicle are illustrated as the objects and the like that necessitate recognition of the driver. However, as having been described with reference to FIG. 4A and the like, those objects and the like can be displayed together with the position information with use of the icon CON1 and the like on the display device 17.

On the other hand, in order to make the driver appropriately recognize the notification content of the audio guidance, or in order to prevent the driver from missing hearing or being confused with the audio guidance because of a sound different from the audio guidance (for example, traveling sounds of the vehicle 1, a conversation between occupants, sounds from a media player or a radio, and the like are typically exemplified, but the sound may be any other sound), it is conceivable that the display on the display device 17 is synchronized with the audio guidance to be visually noticeable.

The synchronization mentioned here includes causing the above display mode on the display device 17 (can be referred to as a "display mode on the display device 17" or simply as a "display mode" in the following description) to dynamically follow the audio information of the audio guidance. Examples include a change in luminance, color, shape, and/or size of the icon CON1 or the like. Alternatively or additionally, the icon CON1 or the like may swing. For example, the display position of the icon CON1 or the like may reciprocate up and down. Furthermore, alternatively or additionally, another display may be presented together with the icon CON1 or the like. For example, a radial pattern may be additionally displayed in the outer periphery of the icon CON1 or the like.

Such a display mode together with synchronization with the audio guidance may be referred to as "synchronization display".

FIG. 6 illustrates some examples of the synchronization display of the icon CON1 (■ mark) of a pattern #01 illustrated in FIG. 5.

The pattern #01a indicates how the luminance (for example, display intensity indicating density, brightness, and the like) of the icon CON1 changes.

A pattern #01b indicates how the color (for example, a ratio of a combination of red light, green light, and blue light) of the icon CON1 changes.

A pattern #01c indicates how the shape of the icon CON1 changes (for example, from a quadrangular shape to another shape).

A pattern #01d indicates how the size (for example, the length in the up-and-down direction or the left-and-right direction) of the icon CON1 changes.

A pattern #01e indicates how the icon CON1 swings (for example, reciprocates up and down).

A pattern #01f indicates how a radial pattern is additionally displayed to the icon CON1 (for example, in the outer periphery of the icon CON1), as another display.

Note that it is sufficient if the mode of the synchronization display is visually and intuitively recognizable from the user including the driver, and is selected and set beforehand by the user from several patterns including the present example. The setting screen may be displayed as a moving image.

Heretofore, the icon CON1 has been exemplified, but the same configuration also applies to the other icon CON2L and the like. In addition, in the following, in order to simplify the description, a case where the pattern #01a is set, that is, a case where the luminance of the icon CON1 is changed by the control signal CNT1 to follow the audio information of the audio guidance will be described.

FIG. 7 is a flowchart illustrating an example of control contents by the control device 19 for achieving such synchronization display. Its outline is that the audio information of the audio guidance that should be output by the audio source device 18 is processed, and the display mode of the icon CON1 on the display device 17 is changed, based on a signal waveform obtained by processing. The present flowchart is performed together with the flowchart of FIG. 3, and may be performed mainly prior to generation of the control signal CNT1 (the control signal CNT21 in the case of the icon CON2L or the like).

In S7000, it is determined whether it is necessary to output the audio guidance from the audio source device 18. In a case where it is necessary to output the audio guidance, the processing proceeds to S7010, and in the other cases, the processing returns to S7000. This necessity determination is also illustrated as another example in a second embodiment to be described later, but can be performed, based on an increase in importance level of a notification to the driver of the external environment corresponding to the icon CON1.

In S7010, the audio information (its audio data) of the audio guidance that should be output by the audio source device 18 is acquired. It is sufficient to acquire the audio information by reading from a memory built in the control device 19, but the audio information may be acquired by reading from another memory outside the control device 19.

In step S7020, filtering processing is performed on the audio information acquired in step S7010, and signal processing using, for example, a low-pass filter is performed to generate a signal waveform enclosing the audio signal.

Figure 8:
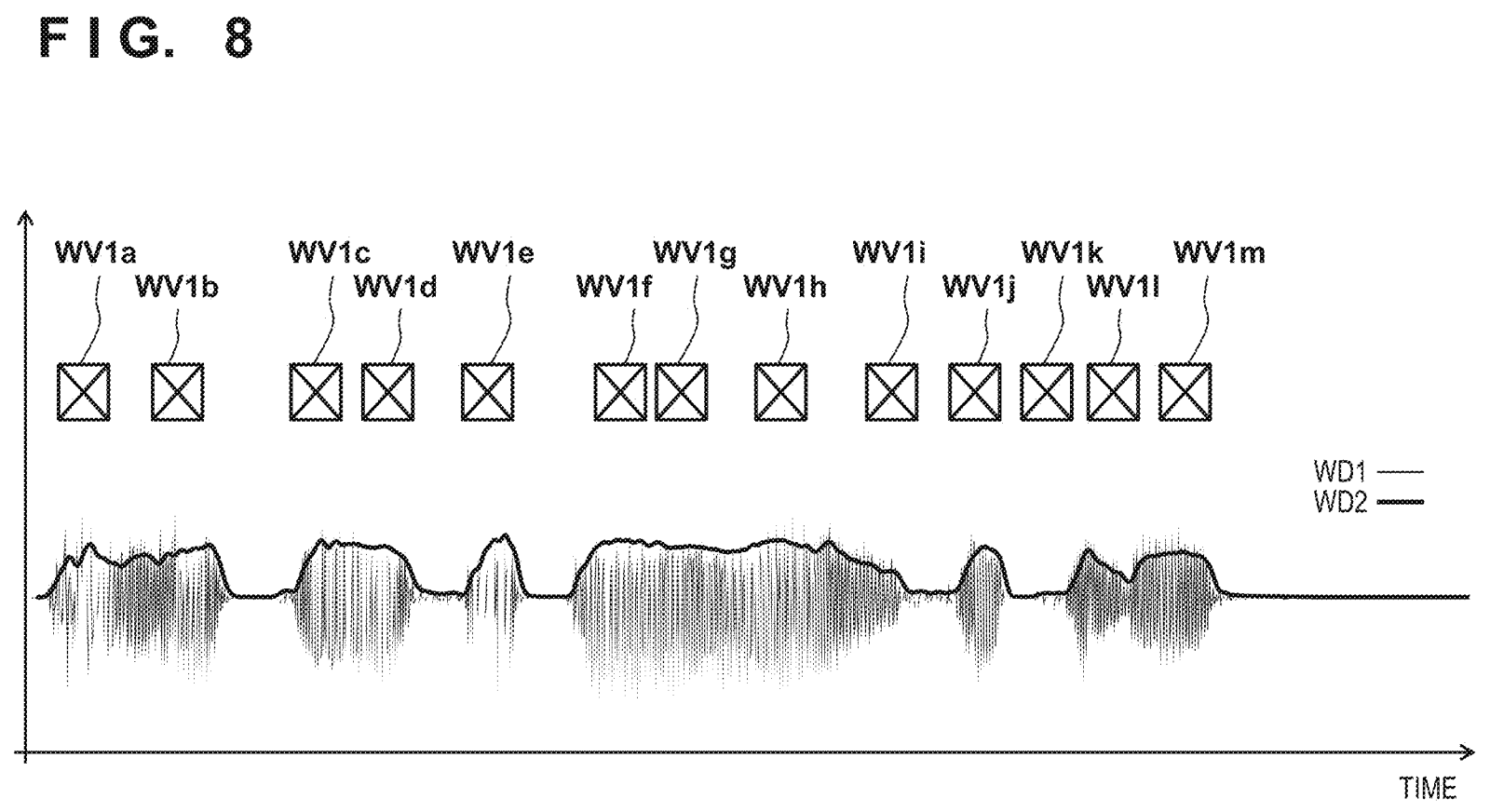

FIG. 8 illustrates an example of the signal waveform that can be generated by the filtering processing using the low-pass filter. Audio data WD1 before the filtering processing includes high-frequency components caused by the tone, the voice quality, or the like. Boxes WV1a to WV1m in the drawing respectively correspond to several voices (for example, voices that constitute the audio information "Turn to the right at that intersection.") including vowels and/or consonants in the audio data WD1. According to the filtering processing in the present example, by removing the above high-frequency components, the signal waveform that substantially encloses the original audio data WD1 is obtained as audio data WD2. Accordingly, the audio data WD2 after the filtering processing substantially indicates the voices WV1a to WV1m including vowels and/or consonants. Note that as the low-pass filter, for example, a filter that allows low-frequency components of 10±5 Hz to pass through can be used.

Referring again to FIG. 7, in S7030, the signal waveform of the audio data WD2 acquired in S7020 is analyzed, and a mode of driving or a timing of driving for synchronizing the display mode on the display device 17 with the signal waveform is determined.

FIGS. 9A to 9D illustrate some examples of modes of driving for the synchronization display that can be determined, based on the audio data WD2. In each drawing, together with the signal waveform of the audio data WD2, the signal value of a drive signal $SIG_{DRV}$ corresponding to the luminance of the icon CON1 (the pattern #01a in FIG. 6) are indicated. For example, when the drive signal $SIG_{DRV}$ takes a high value, the icon CON1 is displayed with high luminance (the display is output to be noticeable), and when the drive signal $SIG_{DRV}$ takes a low value, the icon CON1 is displayed with low luminance (the display is suppressed or is not presented).

Figure 9A:
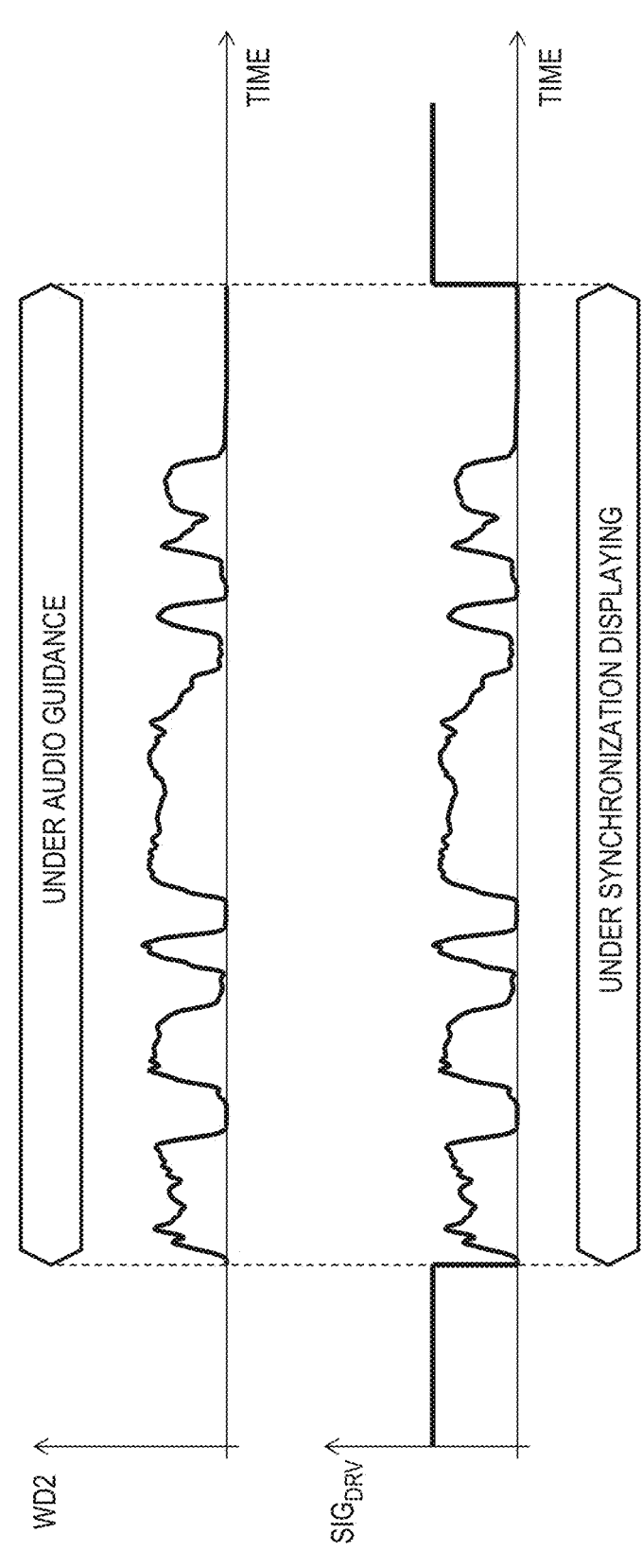
FIG. 9A is a diagram illustrating an example of a mode of driving for synchronization display.

In the example of FIG. 9A, the display mode is synchronized with the signal value in the signal waveform of the audio data WD2, that is, the signal waveform of the drive signal $SIG_{DRV}$ substantially matches the signal waveform of the audio data WD2. The signal value in the signal waveform of the audio data WD2 can typically correspond to the volume (speech amount). Therefore, by synchronizing the display mode with a temporal change of the volume, the luminance of the icon CON1 changes together with the volume of the individual speech in the present example, and for example, blinking of the icon CON1 is interposed.

Figure 9B:
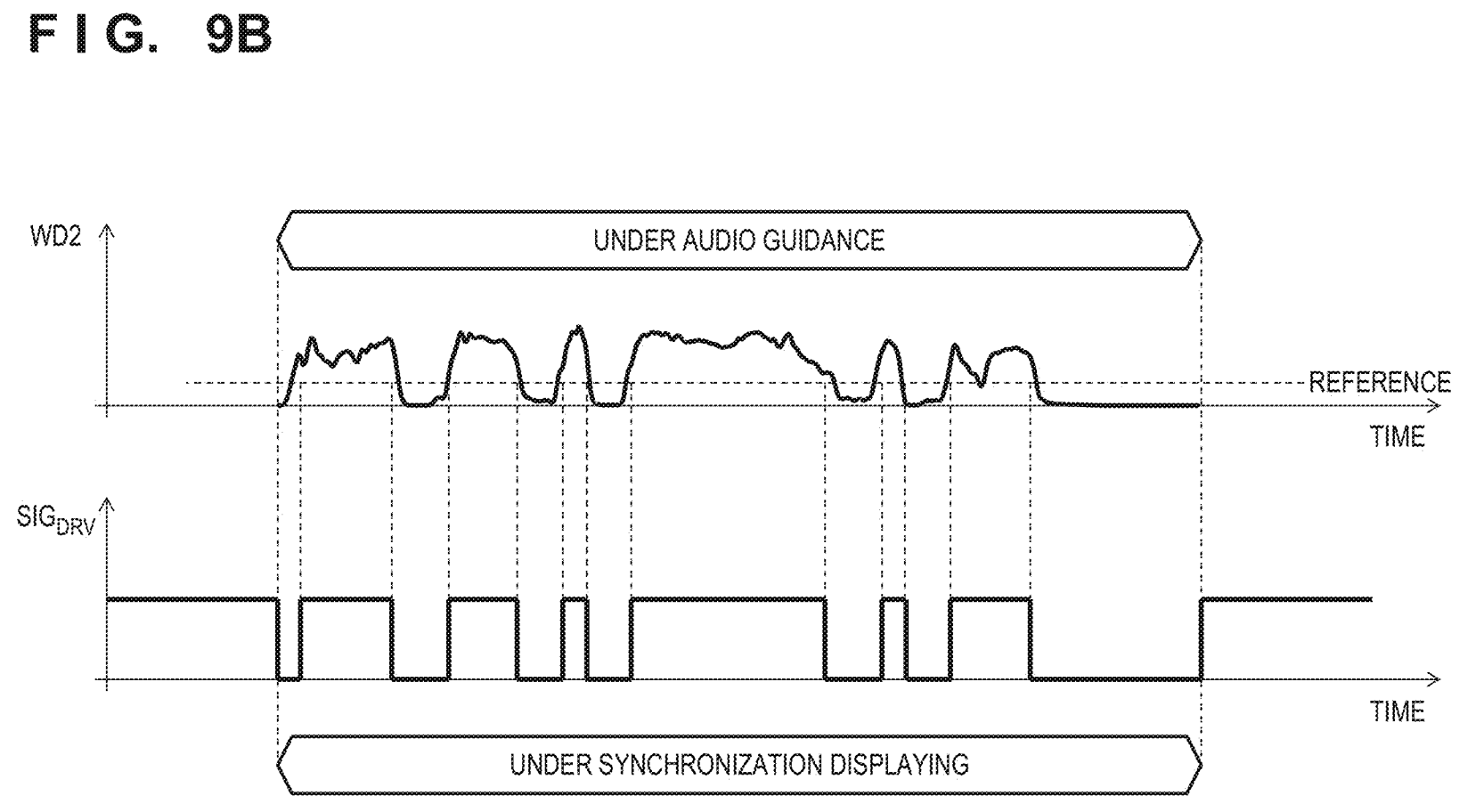

In the example of FIG. 9B, the display mode is synchronized with a timing when the signal value in the signal waveform of the audio data WD2 becomes equal to or smaller than a reference, that is, the display of the icon CON1 is suppressed at the timing when the volume becomes equal to or smaller than the reference. Thus, for example, in a case where a period while the volume does not satisfy the reference is equal to or longer than a predetermined period of time (for example, 20 milliseconds), the blinking of the icon CON1 is interposed, and the synchronization display can be achieved in a form that conforms to a syllable, a mora, or the like.

Figure 9C:
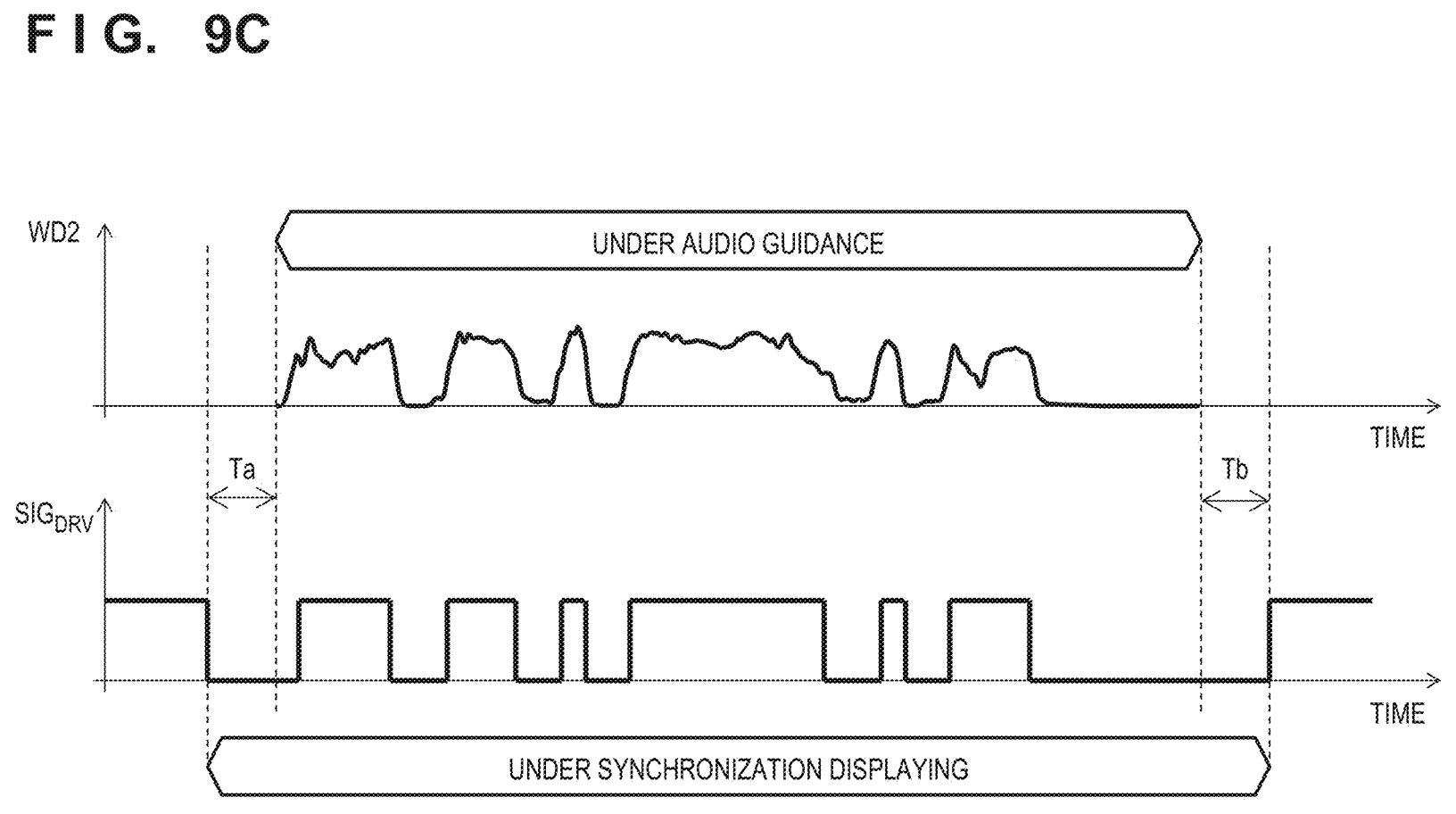

In the example of FIG. 9C, the drive signal $SIG_{DRV}$ is set to a low value not to present the icon CON1 or the luminance is set to be equal to or smaller than a reference for predetermined periods Ta and Tb before the synchronization starts and after the synchronization ends. As each of the periods Ta and Tb, a period that does not make the driver feel uneasy, for example, a value within a range of 100 to 500 milliseconds can be set, and 300 milliseconds can be set preferably. This enables the driver to feel that the start of the audio guidance and the start of the synchronization display are appropriately synchronized with each other, the end of the audio guidance and the end of the synchronization display are appropriately synchronized with each other, and thus the synchronization display is performed in accordance with the entirety of the audio guidance.

Figure 9D:
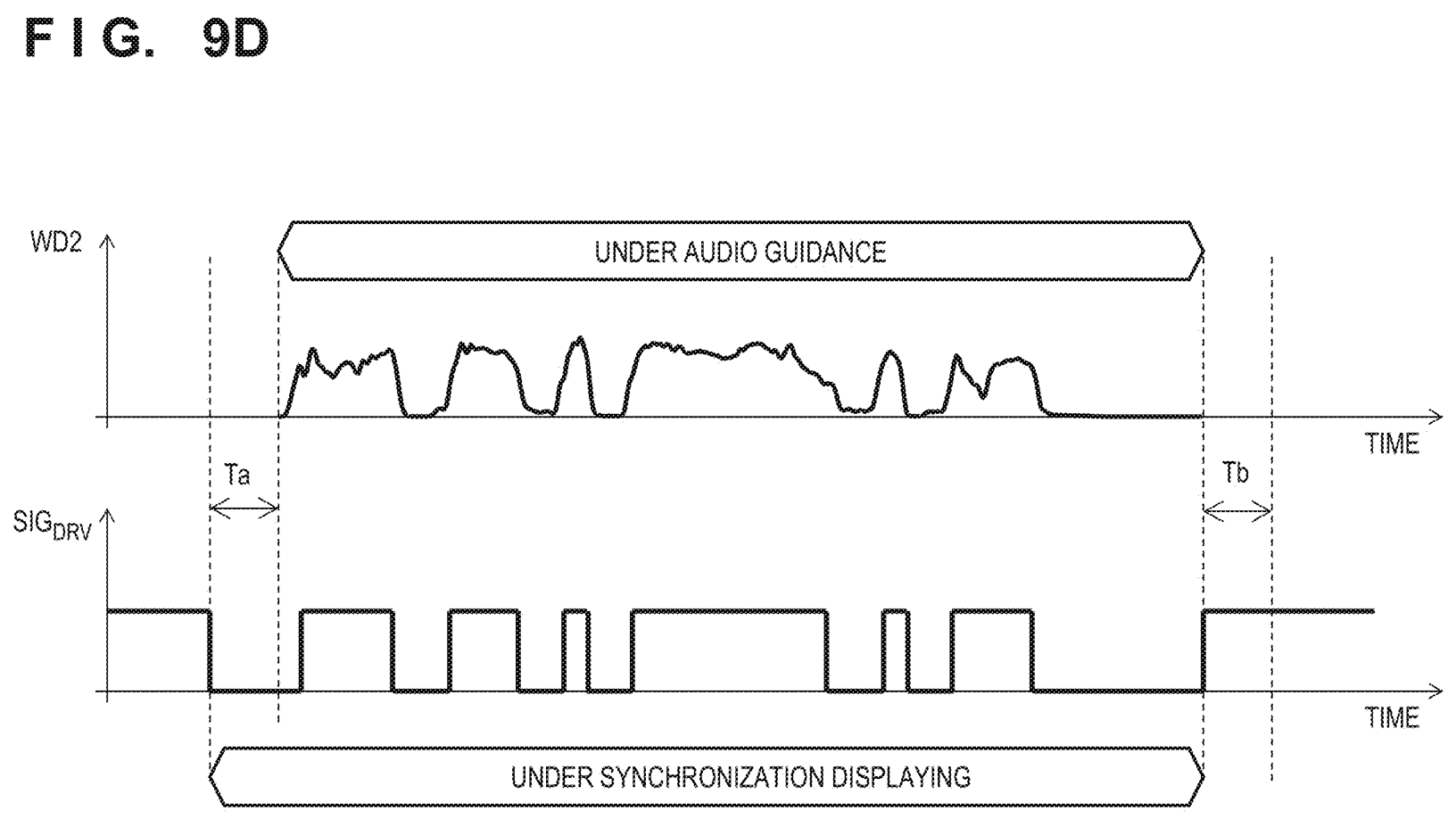

In such synchronization, it is sufficient to distinguish between the audio guidance that is being output and switching of the signal value of the drive signal $SIG_{DRV}$, and thus the period Ta and/or Tb may be omitted, in a case where there is an enough time interval to distinguish between them. That is, in the case of the present example, as illustrated in FIG. 9D, only the period Ta out of the periods Ta and Tb may be provided.

Figure 9E:
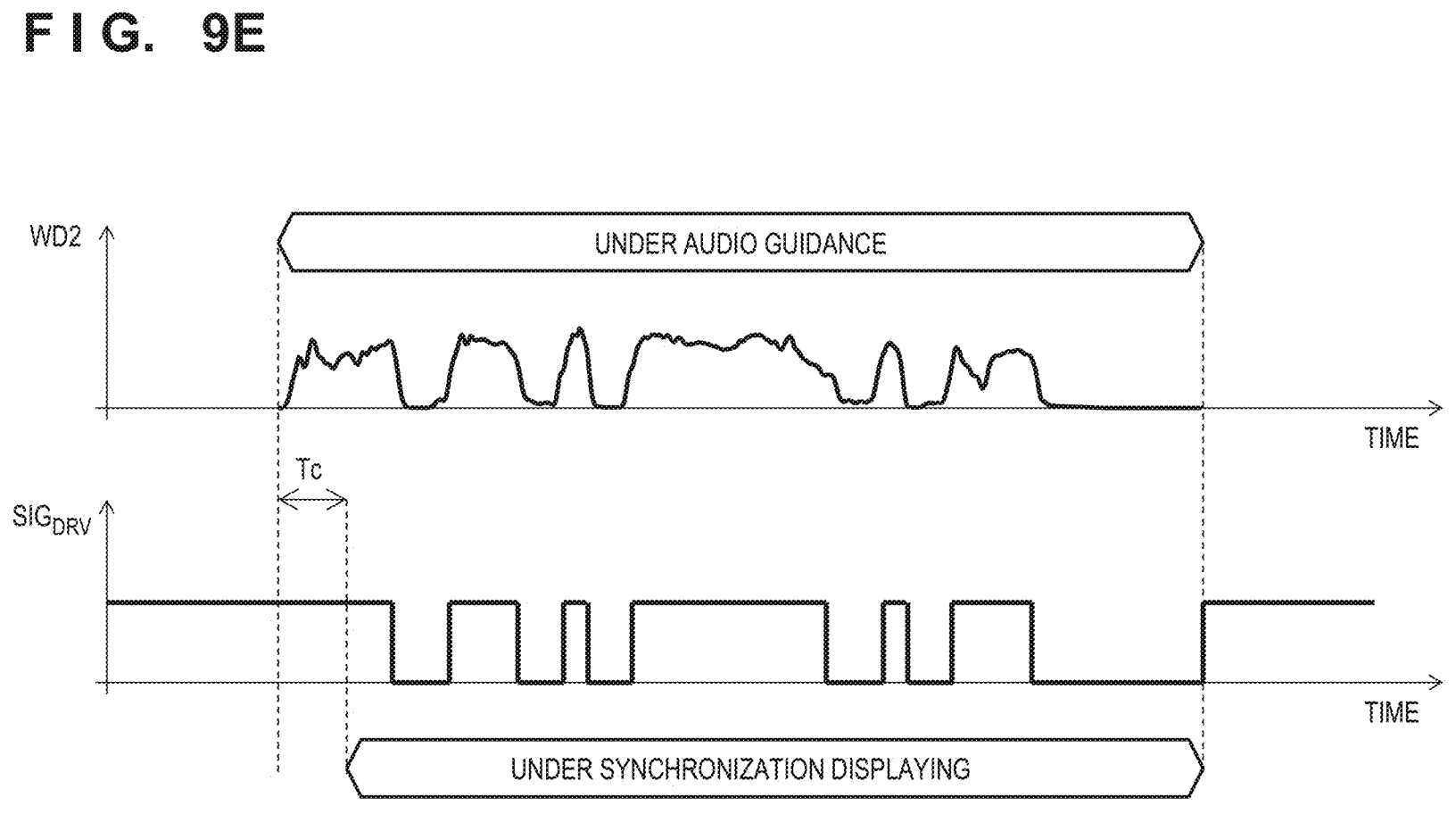

In the example of FIG. 9E, the start timing of the synchronization is shifted and delayed by a predetermined time Tc from the start timing of the audio guidance. As the period Tc, a period that does not make the driver feel uneasy, for example, a value within a range of 100 to 500 milliseconds can be set, and 200 milliseconds can be set preferably. This enables prevention of an unnecessary burden given to the driver caused by an unexpected start of blinking of the icon CON1 (suddenly for the driver).

It is sufficient if the mode of driving for such synchronization display is selected and set beforehand by the user from several patterns including the above examples.

Referring again to FIG. 7, in S7040, the control signal CNT1 is generated and output to the display device 17 so that the display mode on the display device 17 changes in accordance with the mode of driving (see FIGS. 9A to 9D) determined in S7030. This enables the synchronization display of the icon CON1 together with synchronization with the audio guidance.

The above configuration also applies to a case where the synchronization display of the icon CON2 or the like is performed by the control signal CNT21.

In this manner, the control device 19 processes the audio information of the audio guidance that should be output by the audio source device 18, acquires the signal waveform, controls the display device 17 so that the display mode that should be output by the display device 17 is synchronized with the signal waveform, and achieves the synchronization display, accordingly. According to such control of the driving of them, the driver is notified of the external environment that the driver should recognize with use of the audio guidance by the audio source device 18 and the dynamic display mode on the display device 17, so the driver is able to recognize the external environment more appropriately. Therefore, according to the present embodiment, it can be said to be advantageous for further improving the traffic safety.

Second Embodiment

In the first embodiment, in order to facilitate the understanding, the case where there is one icon CON1 or the like displayed on the display device 17 has been exemplified. However, it is also conceivable that there are at least two elements each being as an external environment that the driver should be notified of, and at least two icons CON1 or the like are displayed. In such a case, when the synchronization display is performed for all of such at least two icons CON1 or the like, it is difficult to understand what is indicated by a notification content of the audio guidance, and thereby may be a cause of confusing the driver. Therefore, in the second embodiment, priority is set for at least two elements to be notified, and synchronization display can be performed together with the audio guidance for any one of the at least two elements, the priority of which satisfies a reference.

FIG. 10 is a schematic diagram of the vehicle 1 in a state in which another vehicle OBa and an intersection OBb are detected by the external environment detection device 15, as two elements of the external environment that the driver should be notified of, similarly to FIG. 4A or the like. In the drawing, it is assumed that another vehicle OBa as an oncoming vehicle is about to enter a parking area P1 on a forward side of the vehicle 1, and the vehicle 1 is advancing straight toward the intersection OBb on a further forward side of another vehicle OBa. It is assumed that two icons CON1 in total including an icon CON1*a* corresponding to another vehicle OBa and an icon CON1*b* corresponding to the intersection OBb are displayed on the display device 17.

In such a situation, a case is conceivable in which the audio information of the audio guidance has contents for notifying of the presence of another vehicle OBa not the intersection OBb (as an example, a case where the audio source device 18 outputs audio information including speech "There is an oncoming vehicle. Please be careful."). In such a case, out of the icons CON1*a* and CON1*b*, the icon CON1*a* is to be displayed in synchronization. In FIG. 10, a situation is illustrated in which blinking is interposed in the display of the icon CON1*a* and the display of the icon CON1*b* remains in a lighting state.

In the present embodiment, it is sufficient to notify the driver of the audio information related to the icon CON1*a*. Therefore, in the vehicle body structure in the present embodiment, out of the plurality of audio source devices 181L, 181R, 182L, 182R, 183L, and 183R, it is sufficient if only the audio source device 181R and/or 182R in the vicinity of the driver's seat 12 is driven, but any other audio source device may be driven additionally.

Figure 11:
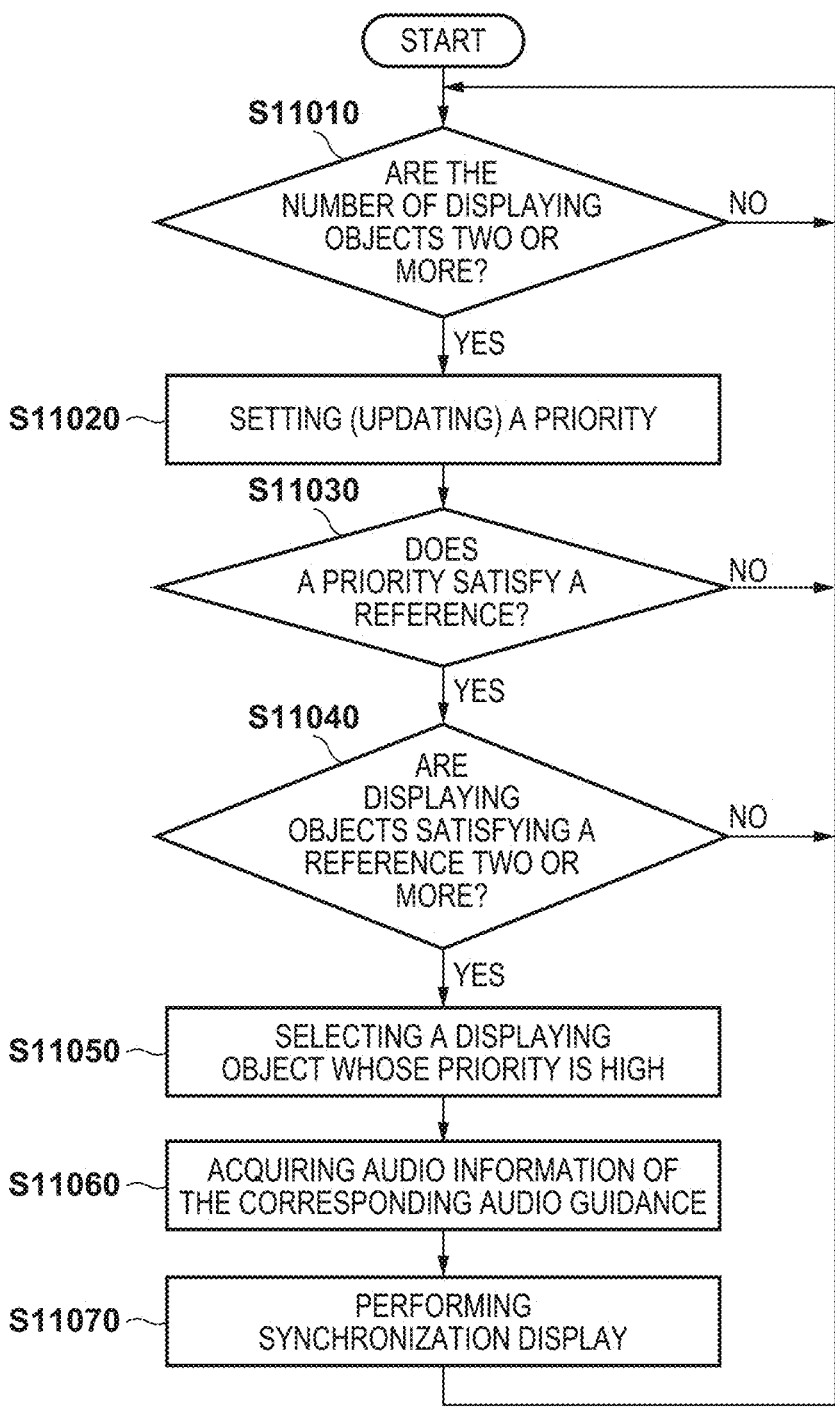
FIG. 11 is a flowchart illustrating an example of control contents by the control device for achieving the synchronization display.

FIG. 11 is a flowchart illustrating an example of control contents by the control device 19 for achieving the synchronization display according to the present embodiment. Its outline is that in a case where there are at least two elements of the external environment to be displayed by the display device 17 (that is, in a case where at least two icons CON1 or the like are displayed), the priority is set for them, and the synchronization display of the corresponding elements is performed together with the audio guidance, based on the priority that has been set. The present flowchart may be performed together with the flowchart of FIG. 3, similarly to the flowchart of FIG. 7.

In S11010, it is determined whether at least two elements are to be displayed with use of the icons CON1 or the like on the display device 17. Here, on the band-shaped display device 17 according to the present embodiment, two or more icons CON1 can be displayed. On the other hand, the icon CON2L or CON2R is displayed at an end portion of the display device 17. Therefore, for example, in a case where at least two objects or the like that are visually unrecognizable through the window member 14 are present on a left lateral side (or a right lateral side) of the vehicle body, they are collectively displayed as a single icon CON2L (or CON2R). Therefore, in the present step, it is determined whether at least two display targets (alternatively, the corresponding elements) are present, instead of the number of icons. In a case where at least two display targets are present, the processing proceeds to S11020, and in the other cases, the processing returns to S11010.

In S11020, the priority is set for each of the at least two display targets (updated in a case of the second time and later). With regard to the priority, an initial value and an additional value of the priority are set beforehand for every scene. For example, "1" is set as the initial value to simply make the driver recognize the presence of an intersection, "+3" is added in a case where a left turn or a right turn is planned at the intersection and a distance to the left turn or the right turn is equal to or shorter than a reference, and "2" is set as the initial value to simply make the driver recognize the presence of an oncoming vehicle.

For the oncoming vehicle, in a case where an inter-vehicle time with respect to the vehicle 1 is equal to or shorter than a reference, "+3" or more is added (note that such an additional value can be determined, based on the inter-vehicle time).

In the above example, the priority to be set for the display corresponding to the intersection is "1" or "4", the priority to be set for the display corresponding to the oncoming vehicle is "2" or "5" or more, and the priority can be similarly set for any other object or the like.

In S11030, it is determined whether the priority of each display target satisfies a reference. For example, "3" is set as the reference. In a case where any one of the priorities satisfies the reference, the processing proceeds to S11040, and in the other cases, the processing returns to S11010.

In S11040, it is determined whether at least two display targets satisfy the reference. In a case where at least two display targets satisfy the reference, the processing proceeds to S11050, and in the other cases (a case of one display target), the processing proceeds to S11060.

In step S11050, a display target having a higher priority is selected from the at least two display targets each having the priority that satisfies the reference.

In S11060, for the element corresponding to the display target, the priority of which satisfies the reference (the display target selected in S11050 in the case of proceeding to the present step from S11050), the corresponding audio information is acquired, because an output of the audio guidance by the audio source device 18 is necessary.

Note that the audio information includes, for example, speech like "Turn to the right at that intersection." in the case of the intersection, and speech like "There is an oncoming vehicle. Please be careful." in the case of the oncoming vehicle.

In S11070, the filtering processing on the audio information, the analysis of a signal waveform obtained by the filtering processing, and the determination of the mode of driving for achieving the synchronization display are performed, and the synchronization display is performed in a similar procedure to S7020 to S7040. After the output of the audio information and the synchronization display are completed, the processing returns to S11010. Thus, in the case where at least two display targets are present, the synchronization display is performed together with the audio guidance selectively for a display target having a high priority.

According to the present embodiment, a priority is set for an individual element in the external environment that should be displayed by the display device 17. In the case where the priority satisfies the reference, the synchronization display is performed by changing the display mode together with the audio guidance for the corresponding display target. In addition, in a case where there are at least two elements each having the priority that satisfies the reference, such as a case where both an oncoming vehicle and an intersection are in close proximity to the vehicle 1, synchronization display is performed for any one of the two elements having a higher priority, and during that time, synchronization display for the other element can be suppressed. Furthermore, before and/or after the synchronization display for one element having a higher priority, the synchronization display for the other element may be suppressed for a predetermined period of time (for example, 200 to 300 milliseconds) for the purpose of preventing the driver from being confused.

Furthermore, in the case where the priority satisfies the reference, the importance level of a notification to the driver is high in many cases. Thus, in such cases, the speed of the audio guidance by the audio source device 18 may be changed and output (for example, at a speed of 1.5 times). In addition, in the case where there are at least two display targets each having the priority that satisfies the reference, it is conceivable that the audio guidance has to be continuously output. Therefore, also in such a case, the speed of the audio guidance may be changed and output. As another embodiment, any other type of the audio information of a relatively short phrase (any other type of the audio information that necessitates a relatively short period of time to be output by the audio source device 18) may be used, for example, "Turn to the right!", "An oncoming vehicle is coming!", or the like.

The contents in the above embodiments can be modified and changed without departing from the gist, and can be utilized in various modes to be exemplified below.

First Modification

A notification mode of an object or the like by the display device 17 and the audio source device 18 may be further changed, based on an attribute of the object or the like. For example, depending on whether the object or the like is a pedestrian or another vehicle, the display mode (for example, the shape, color, or the like) of the icon CON1 or the like may be changed, or alternatively or additionally, the type of audio generated by the audio source device 18 may be changed.

The identification of the attribute of the object or the like is achievable by conducting a known image analysis on the object or the like that has been detected by the external environment detection device 15 in S3000.

Second Modification

In an embodiment, an example has been given in which the mode of controlling the driving of the display device 17 and the audio source device 18 is changed, based on whether an object or the like is visually recognizable from the driver through the window member 14. However, the contents in such an embodiment are also applicable to a vehicle that does not include the window member 14. Its examples include a vehicle on which a driver is able to visually recognize an object or the like substantially directly, such as a straddle type two-wheeled vehicle (without the intervention of any additional element that may be determined by the driver, for example, sunglasses).

In this case, the situation in which the object or the like that is visually recognizable and that has been described in an embodiment corresponds to a situation in which the relative position of the object or the like falls within the display range of the display device 17. Similarly, the situation in which the object or the like is visually unrecognizable corresponds to a situation in which the relative position of the object or the like is outside the display range of the display device 17.

In the case of the straddle type two-wheeled vehicle, the display device 17 may extend in a band shape in the left-and-right direction, for example, along a handlebar or the like in a front part of the driver's seat 12 and the driving operation device 13. In the case of the straddle type two-wheeled vehicle, in general, the attitude of the handlebar (its orientation with respect to the vehicle body) can be optionally changeable by the driver. Therefore, the display position of the icon CON1 or the like can be adjusted further, based on the attitude of the handlebar.

Note that the straddle type two-wheeled vehicle is exemplified here as the vehicle that does not include the window member 14, but the contents in such an embodiment are also applicable to any other known vehicles such as boarding type work machines and small-sized specialized vehicles.

Other Modifications

Modifications and changes may be made to the configuration that has been exemplified in an embodiment without departing from the gist of such an embodiment, and for example, the function of a certain element may be partially or entirely substituted by another element that can directly or indirectly cooperate with the element. In addition, the expression indicating the function may be rephrased as another equivalent expression, accordingly.

For example, some of the functions of the control device 19 may be performed by the detection devices 15 and 16. Specifically, in an embodiment, a series of operations from "identifying" a detection target by the detection devices 15 and 16 to "generating" the position information is performed by the control device 19 (S3010 and S3020 in FIG. 3). However, the series of operations may be partially or entirely achieved by the detection devices 15 and 16. In this case, it can be said that the detection devices 15 and 16 "acquire" the position information of the detection target, and thus each can be rephrased as an acquisition device.

The function may be substituted by an external element in the outside of the vehicle 1. As its typical example, the vehicle 1 acquires a substitution result by the external element on predetermined wireless communication.

As an example of the above-described case of "acquiring" the position information of the detection target, the position information of the detection target is generated by a monitoring camera installed on a road and its image processing device, and the vehicle 1 is capable of acquiring the position information from the image processing device on road-to-vehicle communication. The monitoring camera is attached to an on-road installation such as a traffic light or a road sign, and the image processing device is capable of generating the position information, based on image data obtained by the monitoring camera, and is capable of transmitting the position information to the vehicle 1.

As another example, the position information of the detection target may be generated by another vehicle that is traveling in the surroundings of the vehicle 1, and the vehicle 1 may acquire the position information from the other vehicle in vehicle-to-vehicle communication. The other vehicle is capable of generating the position information, based on a camera or the like mounted on the other vehicle, and is capable of transmitting the position information to the vehicle 1. The other vehicle may be an object itself that is one of the detection targets.

As further another example, the position information of the detection target may be generated by a server apparatus at a remote location, and the vehicle 1 may acquire the position information from the server apparatus on the Internet communication. The server apparatus acquires information in the surroundings of the vehicle 1 from another vehicle in the surroundings of the vehicle 1, and/or acquires information in the surroundings of the vehicle 1 that has been detected by a monitoring camera installed on a road, and thus is capable of generating and transmitting the position information to the vehicle 1.

In these cases, the detection devices 15 and 16 of the vehicle 1 each can be rephrased as an acquisition device, or the vehicle 1 can further include a communication device for acquiring the position information on wireless communication, independently of the detection devices 15 and 16.

Others

In the description heretofore, in order to facilitate the understanding, each element is indicated with a name related to its functional aspect. However, each element is not limited to an element including the content described in the embodiments as a main function, but may be an element including the content as a supplementary function. Thus, each element may be replaced with a similar expression without being strictly limited by its expression.

For the same purpose, the expression "apparatus" may be replaced with "unit", "part (component, piece)", "member", "structure", "assembly" or the like, or may be omitted or attached.

In addition, in the present specification, the vehicle 1 has been exemplified as a typical example. However, it can be said that the contents of the embodiment are applicable to moving bodies that do not include a wheel (vessels and the like), that is, applicable to various moving bodies.

In addition to that, each expression used in the present specification should be interpreted in a broad sense without departing from the spirit of the invention.

Summary of Embodiments

Some characteristics that have been exemplified in the embodiments are as follows.

[1]

A display control system for a moving body, the display control system comprising:

an audio source device configured to give audio guidance about the moving body; a display device capable of displaying information indicating an external environment in surroundings of the moving body; and a control device, wherein the control device processes audio information of the audio guidance to be output by the audio source device, and acquires a signal waveform of the audio information, and controls the display device for a display mode to be output by the display device in synchronization with the acquired signal waveform.

According to such a characteristic, the driver is notified of the external environment that the driver should recognize in a dynamic display mode on the display device together with the audio guidance by the audio source device, so the driver is able to appropriately recognize the external environment. Therefore, it is advantageous for improving the traffic safety.

[2]

The display control system according to [1], wherein the synchronization of the display mode to be output by the display device includes at least one of a change in luminance of a display, a change in color of the display, a change in shape of the display, a change in size of the display, a swing of the display, and another display that accompanies the display.

According to such a characteristic, the synchronization of the display mode is visually recognizable more appropriately, and the driver is able to recognize the external environment more appropriately.

[3]

The display control system according to [1] or [2], wherein the control device performs filtering processing to process the audio information.

According to such a characteristic, the display mode is synchronized at an appropriate frequency, and the driver is able to recognize the external environment more appropriately.

[4]

The display control system according to any one of [1] to [3], wherein the control device controls the display device for the display mode to be output by the display device in synchronization with a signal value in the acquired signal waveform.

According to such a characteristic, the synchronization of the display mode is achievable appropriately, and the driver is able to recognize the external environment more appropriately.

[5]

The display control system according to any one of [1] to [4], wherein the control device synchronizes the display mode to be output by the display device with a temporal change in volume of the audio information, based on the acquired signal waveform.

According to such a characteristic, the synchronization of the display mode is achievable appropriately, and the driver is able to recognize the external environment more appropriately.

[6]

The display control system according to any one of [1] to [5], wherein the control device synchronizes the display mode to be output by the display device with a timing when volume of the audio information becomes equal to or smaller than a reference, based on the acquired signal waveform.

This synchronization conforms to a syllable, a mora, or the like, and for example, in a case where a period while the volume of the audio information does not satisfy the reference is equal to or longer than a predetermined period of time, the display mode is changed by interposing blinking. According to such a characteristic, the synchronization of the display mode is achievable appropriately, and the driver is able to recognize the external environment more appropriately.

[7]

The display control system according to any one of [1] to [6], wherein the control device delays a start timing of the synchronization by a predetermined period of time from a start timing of the audio guidance to be output by the audio source device.

According to such a characteristic, it becomes possible to prevent the synchronization of the display mode from being started at an unexpected timing for the driver, so that an unnecessary burden of the driver's attention can be reduced.

[8]

The display control system according to any one of [1] to [7], wherein the display device is disposed to extend a display range in a left-and-right direction, a first element is defined as an element in the external environment to be displayed on the display device, and in a case where position information indicating a relative position of the first element with respect to the moving body is able to be displayed within the display range that extends in the left-and-right direction, the control device controls the display device to display the position information of the first element in a first mode at a position corresponding to the first element in the display range.

According to such a characteristic, in a case where the position of the external environment that the driver should recognize is present within the display range, the driver is notified of the external environment together with the position, that is, the driver is able to recognize the external environment more appropriately.

[9]

The display control system according to [8], wherein in a case where the position information indicating the relative position of the first element is unable to be displayed within the display range that extends in the left-and-right direction, the control device controls the display device to display the position information of the first element in a second mode different from the first mode at one of both end portions of the display range to correspond to the position of the first element.

According to such a characteristic, also in a case where the position of the external environment that the driver should recognize is out of the display range, the driver is able to recognize the external environment appropriately.

[10]

The display control system according to any one of [1] to [9], wherein the control device sets a priority for an element in the external environment to be displayed on the display device, and changes a display mode corresponding to the element, in a case where the priority satisfies a reference.

According to such a characteristic, it becomes possible to make the driver recognize the external environment with a high priority appropriately.

[11]

The display control system according to [10], wherein at least two elements in the external environment are to be displayed on the display device, and the at least two elements include a first element and a second element, and in a case where the priority of the first element and the priority of the second element both satisfy the reference and the priority of the first element is higher than the priority of the second element, the control device changes a display mode corresponding to the first element, and suppresses a change of a display mode corresponding to the second element before and/or after changing the display mode.

According to such a characteristic, the effect of the above [10] is obtainable more appropriately.

[12]

The display control system according to [10] or [11], wherein in a case where the priority of the element in the external environment to be displayed on the display device satisfies the reference, the control device then controls the audio source device to output the audio guidance about the element, and changes the display mode corresponding to the element.

According to such a characteristic, the effect of the above [10] is obtainable more appropriately.

[13]

The display control system according to any one of [10] to [12], wherein the control device changes luminance of a display corresponding to the element having the priority that satisfies the reference.

According to such a characteristic, the effect of the above is obtainable more appropriately.

[14]

The display control system according to any one of [10] to [13], wherein the control device changes a color of a display corresponding to the element having the priority that satisfies the reference.

According to such a characteristic, the effect of the above is obtainable more appropriately.

[15]

The display control system according to any one of to [14], wherein the control device controls the audio source device to change a speed of the audio guidance about the element having the priority that satisfies the reference and output the audio guidance.

According to such a characteristic, the effect of the above is obtainable more appropriately.

[16]

The display control system according to any one of [1] to [15], wherein the audio source device gives the audio guidance for traveling guidance of the moving body.

According to such a characteristic, the driver is able to appropriately recognize the external environment related to the traveling guidance in the dynamic display mode on the display device together with the audio guidance by the audio source device.

[17]

A method for conducting display control of a display device in a moving body including an audio source device configured to give audio guidance about the moving body and the display device capable of displaying information indicating an external environment in surroundings of the moving body, the method comprising:

a step of processing audio information of the audio guidance to be output by the audio source device, and acquiring a signal waveform of the audio information; and a step of controlling the display device for a display mode to be output by the display device in synchronization with the acquired signal waveform.

According to such a characteristic, a similar effect to the above [1] is obtainable.

[18]

A program for causing a computer to execute display control of a display device in a moving body including an audio source device configured to give audio guidance about the moving body and the display device capable of displaying information indicating an external environment in surroundings of the moving body, the program causing the computer to execute:

processing audio information of the audio guidance to be output by the audio source device, and acquiring a signal waveform of the audio information; and controlling the display device for a display mode to be output by the display device in synchronization with the acquired signal waveform.

According to such a characteristic, a similar effect to the above [1] is obtainable. Such a program may be executed by one or more processors with a memory, and may be stored in a computer-readable storage medium to be executable on the CPU.

The invention is not limited to the foregoing embodiments, and various variations/changes are possible within the spirit of the invention.

What is claimed is:

1. A display control system for a moving body, the display control system comprising:

an audio source device configured to give audio guidance about the moving body;

a display device capable of displaying information indicating an external environment in surroundings of the moving body; and a control device, wherein the control device processes audio information of the audio guidance to be output by the audio source device, and acquires a signal waveform of the audio information, and controls the display device for a display mode to be output by the display device in synchronization with the acquired signal waveform, and the control device synchronizes the display mode to be output by the display device with a timing when volume of the audio information becomes equal to or smaller than a reference, based on the acquired signal waveform.

2. The display control system according to claim 1, wherein the synchronization of the display mode to be output by the display device includes at least one of a change in luminance of a display, a change in color of the display, a change in shape of the display, a change in size of the display, a swing of the display, and another display that accompanies the display.

3. The display control system according to claim 1, wherein the control device performs filtering processing to process the audio information.

4. The display control system according to claim 1, wherein the control device controls the display device for the display mode to be output by the display device in synchronization with a signal value in the acquired signal waveform.

5. The display control system according to claim 1, wherein the control device synchronizes the display mode to be output by the display device with a temporal change in volume of the audio information, based on the acquired signal waveform.

6. The display control system according to claim 1, wherein the control device delays a start timing of the synchronization by a predetermined period of time from a start timing of the audio guidance to be output by the audio source device.

7. The display control system according to claim 1, wherein the display device is disposed to extend a display range in a left-and-right direction, a first element is defined as an element in the external environment to be displayed on the display device, and in a case where position information indicating a relative position of the first element with respect to the moving body is able to be displayed within the display range that extends in the left-and-right direction, the control device controls the display device to display the position information of the first element in a first mode at a position corresponding to the first element in the display range.

8. The display control system according to claim 7, wherein in a case where the position information indicating the relative position of the first element is unable to be displayed within the display range that extends in the left-and-right direction, the control device controls the display device to display the position information of the first element in a second mode different from the first mode at one of both end portions of the display range to correspond to the position of the first element.

9. The display control system according to claim 1, wherein the control device sets a priority for an element in the external environment to be displayed on the display device, and changes a display mode corresponding to the element, in a case where the priority satisfies a reference.

10. The display control system according to claim 9, wherein at least two elements in the external environment are to be displayed on the display device, and the at least two elements include a first element and a second element, and in a case where the priority of the first element and the priority of the second element both satisfy the reference and the priority of the first element is higher than the priority of the second element, the control device changes a display mode corresponding to the first element, and suppresses a change of a display mode corresponding to the second element before and/or after changing the display mode.

11. The display control system according to claim 9, wherein in a case where the priority of the element in the external environment to be displayed on the display device satisfies the reference, the control device then controls the audio source device to output the audio guidance about the element, and changes the display mode corresponding to the element.

12. The display control system according to claim 9, wherein the control device changes luminance of a display corresponding to the element having the priority that satisfies the reference.

13. The display control system according to claim 9, wherein the control device changes a color of a display corresponding to the element having the priority that satisfies the reference.

14. The display control system according to claim 9, wherein the control device controls the audio source device to change a speed of the audio guidance about the element having the priority that satisfies the reference and output the audio guidance.

15. The display control system according to claim 1, wherein the audio source device gives the audio guidance for traveling guidance of the moving body.

16. A method for conducting display control of a display device in a moving body including an audio source device configured to give audio guidance about the moving body and the display device capable of displaying information indicating an external environment in surroundings of the moving body, the method comprising:

a step of processing audio information of the audio guidance to be output by the audio source device, and acquiring a signal waveform of the audio information; and a step of controlling the display device for a display mode to be output by the display device in synchronization with the acquired signal waveform, and the display mode to be output by the display device is synchronized with a timing when volume of the audio information becomes equal to or smaller than a reference, based on the acquired signal waveform.

17. The method according to claim 16, wherein a start timing of the synchronization is delayed by a predetermined period of time from a start timing of the audio guidance to be output by the audio source device.

18. A non-transitory computer-readable storage medium storing a program for causing a computer to execute display control of a display device in a moving body including an audio source device configured to give audio guidance about the moving body and the display device capable of displaying information indicating an external environment in surroundings of the moving body, the program causing the computer to execute:

processing audio information of the audio guidance to be output by the audio source device, and acquiring a signal waveform of the audio information; and controlling the display device for a display mode to be output by the display device in synchronization with the acquired signal waveform, and the display mode to be output by the display device is synchronized with a timing when volume of the audio information becomes equal to or smaller than a reference, based on the acquired signal waveform.

19. The non-transitory computer-readable storage medium according to claim 18, wherein a start timing of the synchronization is delayed by a predetermined period of time from a start timing of the audio guidance to be output by the audio source device.

* * * * *